US012322143B2

(12) United States Patent
Pham Van et al.

(10) Patent No.: US 12,322,143 B2
(45) Date of Patent: Jun. 3, 2025

(54) PERFORMANCE IMPROVEMENT OF GEOMETRY POINT CLOUD COMPRESSION (GPCC) PLANAR MODE USING INTER PREDICTION

(71) Applicant: QUALCOMM Incorporated, San Diego, CA (US)

(72) Inventors: Luong Pham Van, San Diego, CA (US); Geert Van der Auwera, Del Mar, CA (US); Adarsh Krishnan Ramasubramonian, Irvine, CA (US); Bappaditya Ray, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 556 days.

(21) Appl. No.: 17/659,219

(22) Filed: Apr. 14, 2022

(65) Prior Publication Data
US 2022/0351420 A1 Nov. 3, 2022

Related U.S. Application Data

(60) Provisional application No. 63/176,098, filed on Apr. 16, 2021.

(51) Int. Cl.
*G06T 9/00* (2006.01)
*G01S 17/89* (2020.01)
*G06T 17/00* (2006.01)

(52) U.S. Cl.
CPC .............. *G06T 9/001* (2013.01); *G01S 17/89* (2013.01); *G06T 17/00* (2013.01)

(58) Field of Classification Search
CPC .......... G06T 9/001; G06T 17/00; G01S 17/89; H04N 19/96; H04N 19/597
See application file for complete search history.

(56) References Cited

U.S. PATENT DOCUMENTS

2022/0038703 A1* 2/2022 Kato ................... H04N 19/167

FOREIGN PATENT DOCUMENTS

WO WO-2020259978 A1 * 12/2020 ............... G06T 9/40

OTHER PUBLICATIONS (Taquet) Lasserre (Blackberry), S., et al., "M52958 [GPCC] [CE 13.22] Report on Azimuthal Coding Mode", 130. MPEG Meeting, Apr. 20, 2020-Apr. 24, 2020, Alpbach, (Motion Picture Expert Group or ISO/IEC JTC1/SC29/WG11), No. m52958 Mar. 18, 2020, XP030285279, 3 Pages. (Year: 2020).*

(Continued)

*Primary Examiner* — Bobbak Safaipour
*Assistant Examiner* — Ashley L. Hytrek
(74) *Attorney, Agent, or Firm* — QUALCOMM Incorporated; Espartaco Diaz Hidalgo

(57) ABSTRACT

An example device for processing a point cloud includes: a memory configured to store at least a portion of the point cloud; and one or more processors implemented in circuitry and configured to: obtain planar information of a reference block of the point cloud; determine, based on the planar information of the reference block, a context; context-adaptive code, based on the context, a syntax element that indicates whether a current node is coded using a planar mode; code, based on the current node being coded using the planar mode, the current node using the planar mode.

21 Claims, 14 Drawing Sheets

(56) References Cited

OTHER PUBLICATIONS (Taquet) Lasserre (Blackberry) S., et al., "The New Azimuthal Coding Mode", [GPCC][CE13.22 related], 129. MPEG Meeting, Jan. 13, 2020-Jan. 17, 2020, Brussels, (Motion Picture Expert Group or ISO/IEC JTC1/SC29/WG11), No. m51596, Jan. 8, 2020, XP030224661, 31 Pages. (Year: 2020).*

Van L. P., et al., "[G-PCC] [EE13.2 Test 1]: InterEM with Planar Mode Enabled", 135. MPEG Meeting, Jul. 12, 2021-Jul. 16, 2021, Online, Motion Picture Expert Group or ISO/IEC JTC1/SC29/WG11, No. m57286, Jul. 3, 2021, 8 Pages.

3DG: "G-PCC Codec Description v6", Coding of Moving Pictures and Audio, ISO/IEC JTC1/SC29/WG11, N19091, Jan. 2020, Brussels, BE, Mar. 27, 2020, 92 pages.

Auwera G.V.D., et al., "[GPCC] [New] Planar and Azimuthal Coding Mode Simplifications", 131. MPEG Meeting, Jun. 29, 2020-Jul. 3, 2020, Online, (Motion Picture Expert Group or ISO/IEC JTC1/SC29/WG11), No. m54694, Jul. 1, 2020 (Jul. 1, 2020), XP030289263, 7 Pages.

Auwera (QUALCOMM) G.V.D., et al., "[GPCC] [New Proposal] Angular Mode Simplifications and HLS Refinements", 130. MPEG Meeting, Apr. 20, 2020-Apr. 24, 2020, Alpbach, (Motion Picture Expert Group or ISO/IEC JTC1/SC29/WG11), No. m53693, Apr. 15, 2020, XP030287372, 12 Pages.

"Description of Exploration Experiment EE4FE 13.2 on Inter Prediction", 133. MPEG Meeting, Jan. 11, 2021-Jan. 15, 2021, Online, (Motion Picture Expert Group or ISO/IEC JTC1/SC29/WG11), No. N20035, Feb. 10, 2021 (Feb. 10, 2021), XP030293712, 7 Pages.

"Information Technology—MPEG-I (Coded Representation of Immersive Media)—Part 9: Geometry-based Point Cloud Compression", ISO/IEC 23090-9:2020(E), ISO/IEC JTC 1/SC 29/WG 11, 2020, 127 pages.

International Search Report and Written Opinion—PCT/US2022/071733—ISA/EPO—Jul. 22, 2022.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

Lasserre (Blackberry) S., et al., "[GPCC] [CE 13.22 Related] An Improvement of the Planar Coding Mode", 128. MPEG Meeting, Oct. 7, 2019-Oct. 11, 2019, Geneva, (Motion Picture Expert Group or ISO/IEC JTC1/SC29/WG11), No. m50642, Oct. 2, 2019, XP030221087, 3 Pages.

Lasserre (Blackberry), S., et al., "M52958 [GPCC] [CE 13. 22] Report on Azimuthal Coding Mode", 130. MPEG Meeting, Apr. 20, 2020-Apr. 24, 2020, Alpbach, (Motion Picture Expert Group or ISO/IEC JTC1/SC29/WG11), No. m52958 Mar. 18, 2020, XP030285279, 3 Pages.

Lasserre (Blackberry) S., et al., "The New Azimuthal Coding Mode", [GPCC][CE13.22 related], 129. MPEG Meeting, Jan. 13, 2020-Jan. 17, 2020, Brussels, (Motion Picture Expert Group or ISO/IEC JTC1/SC29/WG11), No. m51596, Jan. 8, 2020, XP030224661, 31 Pages.

Lasserre S., (Blackberry) et al., "[GPCC] [CE 13.22 ] Report on Angular Coding Mode", 129. MPEG Meeting, Jan. 13, 2020-Jan. 17, 2020, Brussels, (Motion Picture Expert Group or ISO/IEC JTC1/SC29/WG11). No. M51594, Jan. 8, 2020, XP030224657, 4 Pages.

Lasserre S., et al., "m48906_Planar Mode in Octree-Based Geometry Coding", 127. MPEG Meeting, Jul. 8, 2019-Jul. 12, 2019, Gothenburg, (Motion Picture Expert Group or ISO/IEC JTC1/SC29/WG11) No. m48906, Jul. 3, 2019 (Jul. 3, 2019), XP030222328, 33 Pages.

Lasserre S., "Exploratory Model for Inter-Prediction in G-PCC", 124. MPEG Meeting, Oct. 8, 2018-Oct. 12, 2018, MACAO, (Motion Picture Expert Group or ISO/IEC JTC1/SC29/WG11), No. n18096, Oct. 31, 2018, XP030193470, 4 Pages.

* cited by examiner

PERFORMANCE IMPROVEMENT OF GEOMETRY POINT CLOUD COMPRESSION (GPCC) PLANAR MODE USING INTER PREDICTION

This application claims the benefit of U.S. Provisional Patent Application No. 63/176,098, filed Apr. 16, 2021, the entire contents of which is incorporated herein by reference.

TECHNICAL FIELD

This disclosure relates to point cloud encoding and decoding.

SUMMARY

In general, this disclosure describes techniques for coding nodes of a point cloud using inter prediction, such as for the Geometry Point Cloud Compression (G-PCC) standard currently being developed. However, the example techniques are not limited to the G-PCC standard. The reference block of a node may be derived by motion compensation using the estimated motion information (rotation and translation). A good estimation of motion information may lead to a high correlation in geometry structure terms, such as occupancy, planar information between the current node and the reference node. As such, utilizing this geometry information of the reference node may improve the coding performance of the current node. This disclosure includes several techniques to utilize the information of a reference block in coding of the planar information of the current node. Generally, this information may be used in eligibility of a node for planar coding mode, selection of contexts in coding the planar flag and plane index.

In accordance with one or more techniques of this disclosure, a G-PCC coder may include a memory configured to store at least a portion of the point cloud; and one or more processors implemented in circuitry and configured to: obtain planar information of a reference block of the point cloud; determine, based on the planar information of the reference block, a context; context-adaptive code, based on the context, a syntax element that indicates whether a current node is coded using a planar mode; and code, based on the current node being coded using the planar mode, the current node using the planar mode.

In one example, a method of processing a point cloud includes obtaining planar information of a reference block of the point cloud; determining, based on the planar information of the reference block, a context; context-adaptive coding, based on the context, a syntax element that indicates whether a current node is coded using a planar mode; and coding, based on the current node being coded using the planar mode, the current node using the planar mode.

In another example, computer-readable storage medium stores instructions that, when executed by one or more processors, cause the one or more processors to: obtain planar information of a reference block of a point cloud; determine, based on the planar information of the reference block, a context; context-adaptive code, based on the context, a syntax element that indicates whether a current node is coded using a planar mode; and code, based on the current node being coded using the planar mode, the current node using the planar mode.

The details of one or more examples are set forth in the accompanying drawings and the description below. Other features, objects, and advantages will be apparent from the description, drawings, and claims.

DETAILED DESCRIPTION

Figure 1:
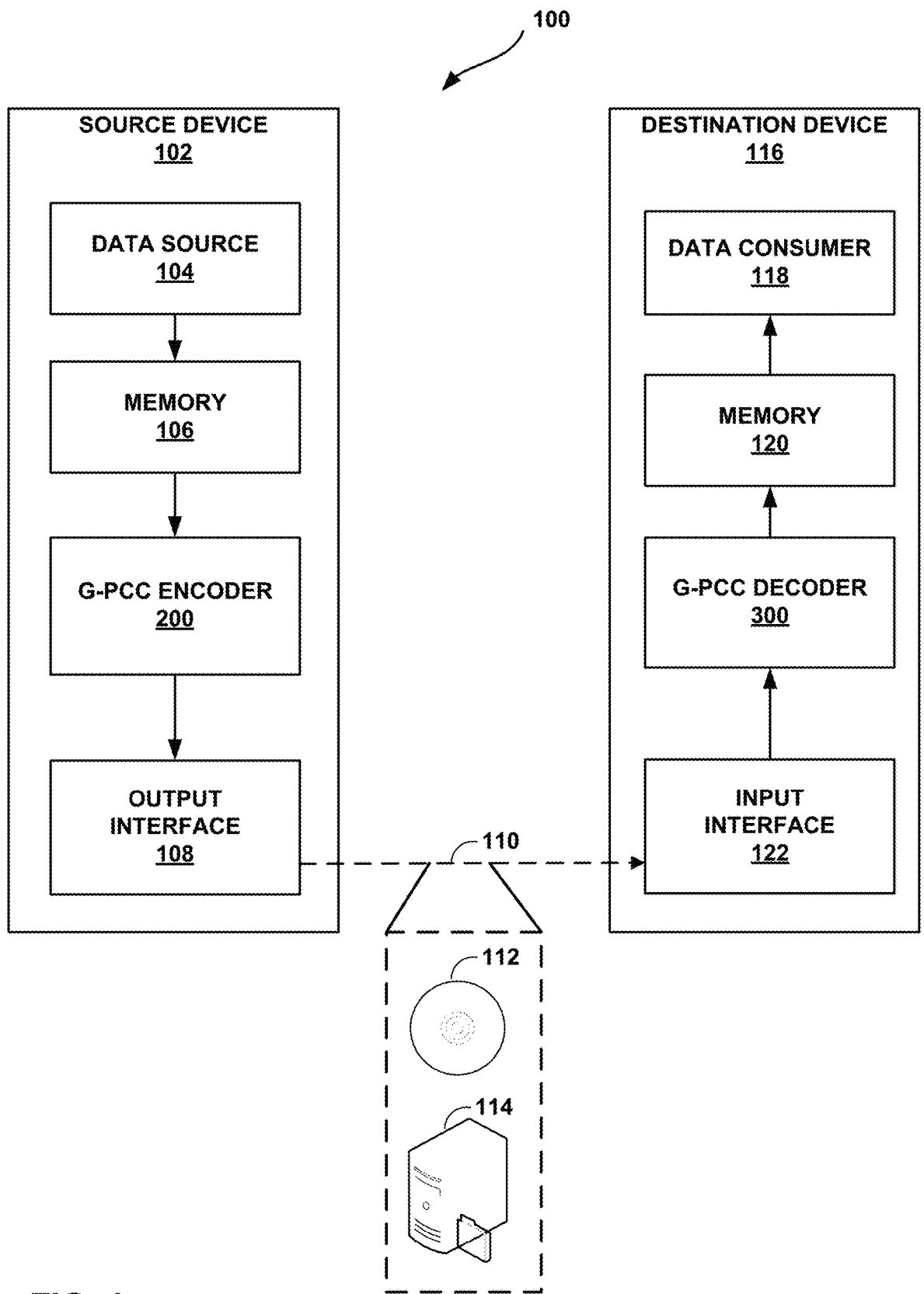
FIG. 1 is a block diagram illustrating an example encoding and decoding system that may perform the techniques of this disclosure.

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. In accordance with this disclosure, G-PCC encoder 200 of source device 102 and G-PCC decoder 300 of destination device 116 may be configured to apply the techniques of this disclosure related to utilizing information of a reference block in coding of the planar information of the current node (e.g., a current block). Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this disclosure related to utilizing information of a reference block in coding of the planar information of the current node. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames") of the data to G-PCC encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively or additionally, point cloud data may be computer-generated from scanner, camera, sensor or other data. For example, data source 104 may generate computer graphics-based data as the source data, or produce a combination of live data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard or a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11) is studying the potential need for standardization of point cloud coding technology with a compression capability that significantly exceeds that of the current approaches and will target to create the standard. The group is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry i.e., position of a set of points in 3D space, and associated attribute values (for each point associated with the 3D geometry). G-PCC addresses the compression of point clouds in both Category 1 (static point clouds) and Category 3 (dynamically acquired point clouds). A recent draft of the G-PCC standard is available in G-PCC DIS, ISO/IEC JTC1/SC29/WG11 w19088, Brussels, Belgium, January 2020, and a description of the codec is available in G-PCC Codec Description v6, ISO/IEC JTC1/SC29/WG11 w19091, Brussels, Belgium, January 2020.

A point cloud contains a set of points in a 3D space, and may have attributes associated with the point. The attributes may be color information such as R, G, B or Y, Cb, Cr, or reflectance information, or other attributes. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation).

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

Figure 2:
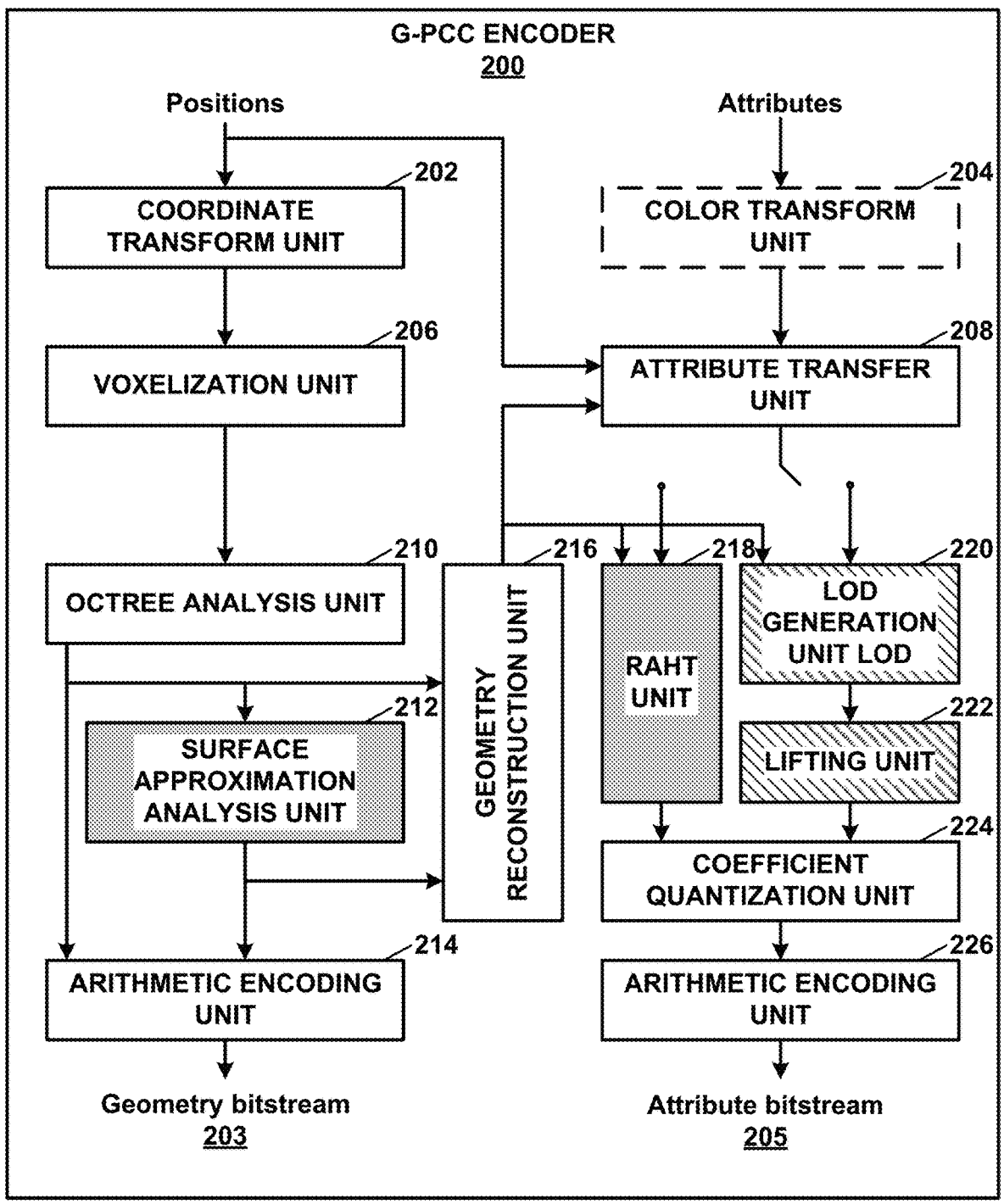
FIG. 2 is a block diagram illustrating an example Geometry Point Cloud Compression (G-PCC) encoder.
Figure 3:
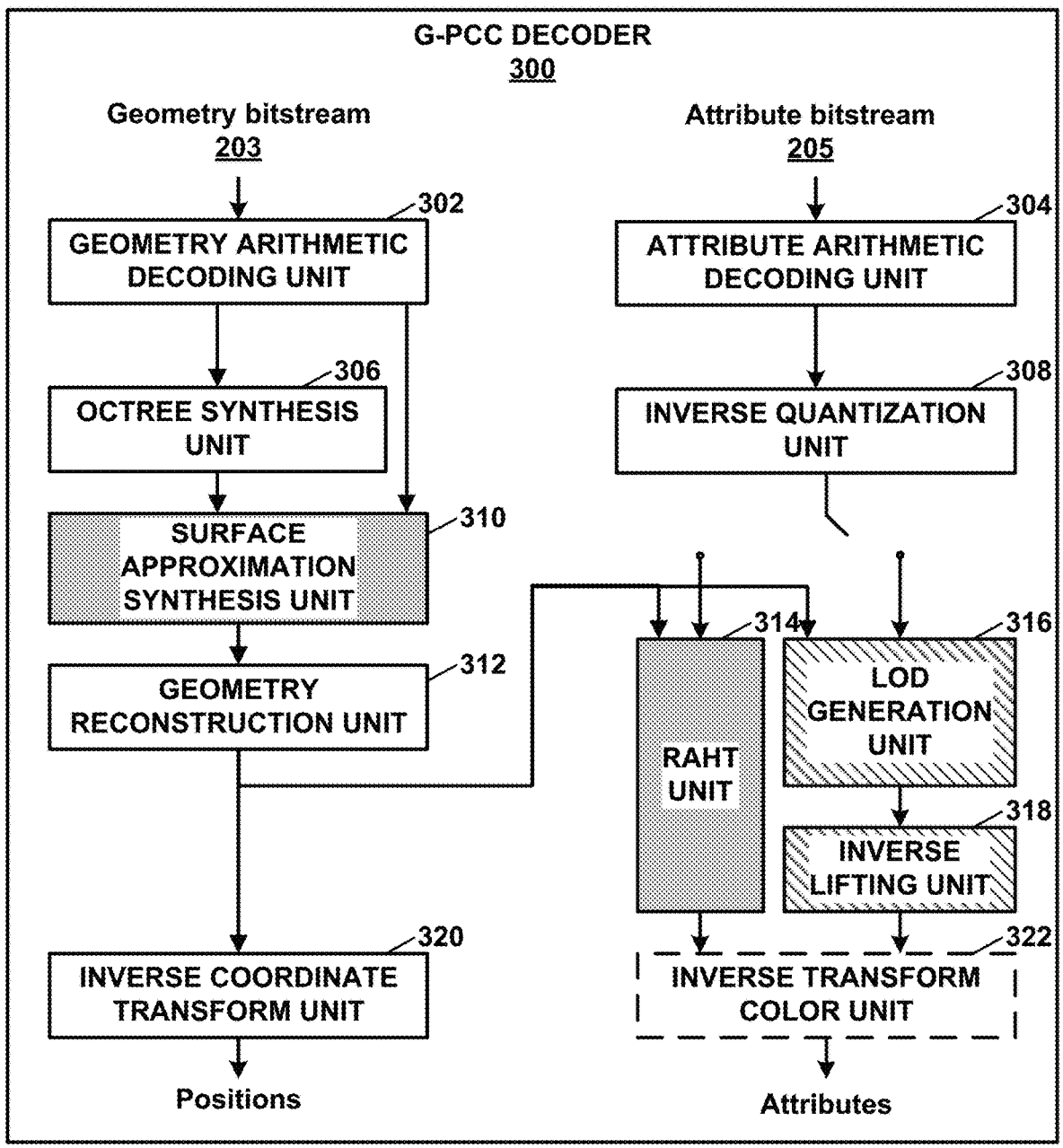
FIG. 3 is a block diagram illustrating an example G-PCC decoder.

FIG. 2 provides an overview of G-PCC encoder 200. FIG. 3 provides an overview of G-PCC decoder 300. The modules shown are logical, and do not necessarily correspond one-to-one to implemented code in the reference implementation of G-PCC codec, i.e., TMC13 test model software studied by ISO/IEC MPEG (JTC 1/SC 29/WG 11).

In both G-PCC encoder 200 and G-PCC decoder 300, point cloud positions are coded first. Attribute coding depends on the decoded geometry. In FIG. 2 and FIG. 3, the gray-shaded modules are options typically used for Category 1 data. Diagonal-crosshatched modules are options typically used for Category 3 data. All the other modules are common between Categories 1 and 3.

For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup. The Category 1 geometry codec is therefore known as the Trisoup geometry codec, while the Category 3 geometry codec is known as the Octree geometry codec.

At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec also supports a direct coding mode where the 3D position of the point is encoded directly. A flag may be signaled to indicate that a direct mode is signaled. At the lowest level, the number of points associated with the octree node/leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbour prediction with an update/lifting step (Lifting Transform). RAHT and Lifting are typically used for Category 1 data, while Predicting is typically used for Category 3 data. However, either method may be used for any data, and, just like with the geometry codecs in G-PCC, the attribute coding method used to code the point cloud is specified in the bitstream.

The coding of the attributes may be conducted in a level-of-detail (LOD), where with each level of detail a finer representation of the point cloud attribute may be obtained. Each level of detail may be specified based on distance metric from the neighboring nodes or based on a sampling distance.

At G-PCC encoder 200, the residuals obtained as the output of the coding methods for the attributes are quantized. The residuals may be obtained by subtracting the attribute value from a prediction that is derived based on the points in the neighborhood of the current point and based on the attribute values of points encoded previously. The quantized residuals may be coded using context adaptive arithmetic coding.

In the example of FIG. 2, G-PCC encoder 200 may include a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit 216, an RAHT unit 218, a LOD generation unit 220, a lifting unit 222, a coefficient quantization unit 224, and an arithmetic encoding unit 226.

As shown in the example of FIG. 2, G-PCC encoder 200 may obtain a set of positions of points in the point cloud and a set of attributes. G-PCC encoder 200 may obtain the set of positions of the points in the point cloud and the set of attributes from data source 104 (FIG. 1). The positions may include coordinates of points in a point cloud. The attributes may include information about the points in the point cloud, such as colors associated with points in the point cloud. G-PCC encoder 200 may generate a geometry bitstream 203 that includes an encoded representation of the positions of the points in the point cloud. G-PCC encoder 200 may also generate an attribute bitstream 205 that includes an encoded representation of the set of attributes.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform to transform color information of the attributes to a different domain. For example, color transform unit 204 may transform color information from an RGB color space to a YCbCr color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point. Furthermore, octree analysis unit 210 may generate an octree based on the voxelized transform coordinates. Additionally, in the example of FIG. 2, surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. G-PCC encoder 200 may output these syntax elements in geometry bitstream 203. Geometry bitstream 203 may also include other syntax elements, including syntax elements that are not arithmetically encoded.

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud.

Furthermore, RAHT unit 218 may apply RAHT coding to the attributes of the reconstructed points. In some examples, under RAHT, the attributes of a block of 2×2×2 point positions are taken and transformed along one direction to obtain four low (L) and four high (H) frequency nodes. Subsequently, the four low frequency nodes (L) are transformed in a second direction to obtain two low (LL) and two high (LH) frequency nodes. The two low frequency nodes (LL) are transformed along a third direction to obtain one low (LLL) and one high (LLH) frequency node. The low frequency node LLL corresponds to DC coefficients and the high frequency nodes H, LH, and LLH correspond to AC coefficients. The transformation in each direction may be a 1-D transform with two coefficient weights. The low frequency coefficients may be taken as coefficients of the 2×2×2 block for the next higher level of RAHT transform and the AC coefficients are encoded without changes; such transformations continue until the top root node. The tree traversal for encoding is from top to bottom used to calculate the weights to be used for the coefficients; the transform order is from bottom to top. The coefficients may then be quantized and coded.

Alternatively or additionally, LOD generation unit 220 and lifting unit 222 may apply LOD processing and lifting, respectively, to the attributes of the reconstructed points. LOD generation is used to split the attributes into different refinement levels. Each refinement level provides a refinement to the attributes of the point cloud. The first refinement level provides a coarse approximation and contains few points; the subsequent refinement level typically contains more points, and so on. The refinement levels may be constructed using a distance-based metric or may also use one or more other classification criteria (e.g., subsampling from a particular order). Thus, all the reconstructed points may be included in a refinement level. Each level of detail is produced by taking a union of all points up to particular refinement level: e.g., LOD1 is obtained based on refinement level RL1, LOD2 is obtained based on RL1 and RL2, . . . LODN is obtained by union of RL1, RL2, . . . RLN. In some cases, LOD generation may be followed by a prediction scheme (e.g., predicting transform) where attributes associated with each point in the LOD are predicted from a weighted average of preceding points, and the residual is quantized and entropy coded. The lifting scheme builds on top of the predicting transform mechanism, where an update operator is used to update the coefficients and an adaptive quantization of the coefficients is performed.

RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in attribute bitstream 205. Attribute bitstream 205 may also include other syntax elements, including non-arithmetically encoded syntax elements.

In the example of FIG. 3, G-PCC decoder 300 may include a geometry arithmetic decoding unit 302, an attribute arithmetic decoding unit 304, an octree synthesis unit 306, an inverse quantization unit 308, a surface approximation synthesis unit 310, a geometry reconstruction unit 312, a RAHT unit 314, a LoD generation unit 316, an inverse lifting unit 318, an inverse transform coordinate unit 320, and an inverse transform color unit 322.

G-PCC decoder 300 may obtain a geometry bitstream 203 and attribute bitstream 205. Geometry arithmetic decoding unit 302 of decoder 300 may apply arithmetic decoding (e.g., Context-Adaptive Binary Arithmetic Coding (CA-BAC) or other type of arithmetic decoding) to syntax elements in geometry bitstream 203. Similarly, attribute arithmetic decoding unit 304 may apply arithmetic decoding to syntax elements in attribute bitstream 205.

Octree synthesis unit 306 may synthesize an octree based on syntax elements parsed from geometry bitstream 203. Starting with the root node of the octree, the occupancy of each of the eight children node at each octree level is signaled in the bitstream. When the signaling indicates that a child node at a particular octree level is occupied, the occupancy of children of this child node is signaled. The signaling of nodes at each octree level is signaled before proceeding to the subsequent octree level. At the final level of the octree, each node corresponds to a voxel position; when the leaf node is occupied, one or more points may be specified to be occupied at the voxel position. In some instances, some branches of the octree may terminate earlier than the final level due to quantization. In such cases, a leaf node is considered an occupied node that has no child nodes. In instances where surface approximation is used in geometry bitstream 203, surface approximation synthesis unit 310 may determine a surface model based on syntax elements parsed from geometry bitstream 203 and based on the octree.

Furthermore, geometry reconstruction unit 312 may perform a reconstruction to determine coordinates of points in a point cloud. For each position at a leaf node of the octree, geometry reconstruction unit 312 may reconstruct the node position by using a binary representation of the leaf node in the octree. At each respective leaf node, the number of points at the respective leaf node is signaled; this indicates the number of duplicate points at the same voxel position. When geometry quantization is used, the point positions are scaled for determining the reconstructed point position values.

Inverse transform coordinate unit 320 may apply an inverse transform to the reconstructed coordinates to convert the reconstructed coordinates (positions) of the points in the point cloud from a transform domain back into an initial domain. The positions of points in a point cloud may be in floating point domain but point positions in G-PCC codec are coded in the integer domain. The inverse transform may be used to convert the positions back to the original domain.

Additionally, in the example of FIG. 3, inverse quantization unit 308 may inverse quantize attribute values. The attribute values may be based on syntax elements obtained from attribute bitstream 205 (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. RAHT decoding is done from the top to the bottom of the tree. At each level, the low and high frequency coefficients that are derived from the inverse quantization process are used to derive the constituent values. At the leaf node, the values derived correspond to the attribute values of the coefficients. The weight derivation process for the points is similar to the process used at G-PCC encoder 200. Alternatively, LOD generation unit 316 and inverse lifting unit 318 may determine color values for points of the point cloud using a level of detail-based technique. LOD generation unit 316 decodes each LOD giving progressively finer representations of the attribute of points. With a predicting transform, LOD generation unit 316 derives the prediction of the point from a weighted sum of points that are in prior LODs, or previously reconstructed in the same LOD. LOD generation unit 316 may add the prediction to the residual (which is obtained after inverse quantization) to obtain the reconstructed value of the attribute. When the lifting scheme is used, LOD generation unit 316 may also include an update operator to update the coefficients used to derive the attribute values. LOD generation unit 316 may also apply an inverse adaptive quantization in this case.

Furthermore, in the example of FIG. 3, inverse transform color unit 322 may apply an inverse color transform to the color values. The inverse color transform may be an inverse of a color transform applied by color transform unit 204 of encoder 200. For example, color transform unit 204 may transform color information from an RGB color space to a YCbCr color space. Accordingly, inverse color transform unit 322 may transform color information from the YCbCr color space to the RGB color space.

The various units of FIG. 2 and FIG. 3 are illustrated to assist with understanding the operations performed by encoder 200 and decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

The planar coding mode first proposed in (Sébastien Lasserre, David Flynn, "[GPCC] Planar mode in octree-based geometry coding," ISO/IEC JTC1/SC29/WG11 MPEG/m48906, Gothenburg, Sweden, July 2019) was adopted (Sébastien Lasserre, Jonathan Taquet, "[GPCC] CE13.22 report on planar coding mode," ISO/IEC JTC1/SC29/WG11 MPEG/m50008, Geneva, Switzerland, October 2019) at the 128$^{th}$ MPEG meeting in Geneva, Switzerland. The angular coding mode first proposed in (Sébastien Lasserre, Jonathan Taquet, "[GPCC][CE 13.22 related] An improvement of the planar coding mode," ISO/IEC JTC1/SC29/WG11 MPEG/m50642, Geneva, CH, October 2019, hereinafter "m50642") was adopted (Sébastien Lasserre, Jonathan Taquet, "[GPCC] CE 13.22 report on angular mode," ISO/IEC JTC1/SC29/WG11 MPEG/m51594, Brussels, Belgium, January 2020, hereinafter "m51594") at the 129$^{th}$ MPEG meeting in Brussels, Belgium, and enhances the coding efficiency of the planar mode by using the sensor characteristics of a typical LIDAR sensor. The angular coding mode is optionally used together with the planar mode and improves the coding of the vertical (z) plane position syntax element by employing knowledge of positions and angles of sensing laser beams in a typical LIDAR sensor. Furthermore, the angular coding mode can optionally be used to improve the coding of vertical z-position bits in IDCM. In a separate contribution (Geert Van der Auwera, Bappaditya Ray, Louis Kerofsky, Adarsh K. Ramasubramonian, Marta Karczewicz, "[GPCC][New Proposal] Angular mode simplifications and HLS refinements," ISO/IEC JTC1/SC29/WG11 MPEG/m53693, Teleconference (previously Alpbach meeting), April 2020), the angular coding mode's context derivation was simplified and the HLS coding of sensor data parameters was made more efficient. The angular mode descriptions in the following sections are based on the original MPEG contributions documents [m50642, m51594] and the GPCC DIS text (G-PCC DIS, ISO/IEC JTC1/SC29/WG11 w19617, Teleconference, November 2020, hereinafter "GPCC DIS").

The azimuthal coding mode first proposed in (Sébastien Lasserre, Jonathan Taquet, "[GPCC] [CE13.22 related] The azimuthal coding mode," ISO/IEC JTC1/SC29/WG11 MPEG/m51596, Brussels, Belgium, January 2020, hereinafter "m51596") was adopted (Sébastien Lasserre, Jonathan Taquet, "[GPCC] [CE 13.22] Report on azimuthal coding mode," ISO/IEC JTC1/SC29/WG11 MPEG/m52958, Teleconference (previously Alpbach meeting), April 2020, hereinafter "m52958") at the 130$^{th}$ MPEG teleconference meeting. The azimuthal coding mode is similar to the angular mode and extends it to the coding of the (x) and (y) plane position syntax elements of the planar mode and improves the coding of the x- or y-position bits in IDCM. In a separate contribution (Geert Van der Auwera, Bappaditya Ray, Adarsh K. Ramasubramonian, Marta Karczewicz, "[GPCC] [New Proposal] Planar and azimuthal coding mode simplifications," ISO/IEC JTC1/SC29/WG11 MPEG/m54694, Teleconference, July 2020, hereinafter "m54694") at the 131$^{st}$ MPEG teleconference meeting, the number of contexts used in the azimuthal mode was significantly reduced.

Note: "angular mode" may also refer to azimuthal mode in sections below.

The specification related to planar coding mode is summarized in GPCC DIS as follows:

8.2.3.1 Eligibility of a Node for Planar Coding Mode

XXX Split and Relocate

[XXX, this Process is Missing the Planar Rate Update after Decoding is_planar_flag]

Explicit coding of occupancy planes is conditioned on the probability of XXX.

The array PlanarRate, with elements PlanarRate[k], for k=0 . . . 2, is an estimate of the probability that the occupancy of a node forms a single plane perpendicular to the k-th axis.

The variable LocalDensity is an estimate of the mean number of occupied children in a node.

The variable NumNodesUntilPlanarUpdate counts the number of nodes to be parsed before updating PlanarRate and LocalDensity.

[XXX Entropy State Continuation]

At the start of parsing a geometry_octree syntax structure, PlanarRate and LocalDensity are initialised as follows:

for ($k=0;k<3;k++$)

PlanarRate[$k$]=1024

LocalDensity=4096

NumNodesUntilPlanarUpdate=0

At the start of parsing each geometry_octree_node syntax struture, NumNodesUntilPlanarUpdate is decremented. If NumNodesUntilPlanarUpdate is less than zero, PlanarRate and LocalDensity are updated as follows:

The number of occupied sibling nodes is determined and used to update the LocalDensity estimate:

let numSiblings=NodeNumChildren[depth−1][sNp][tNp][vNp]

LocalDensity=(255×LocalDensity+1024×numSiblings)>>8

The number of nodes until the next update is:

NumNodesUntilPlanarUpdate=numSiblings−1 XXX

The parent node's occupancy information is used to determine, along each axis, the presence of a single occupied plane and to update the corresponding planar probability estimate PlanarRate[k].

```
let parentOccupancy = GeometryNodeOccupancy[depth - 1][sNp][tNp][vNp]
let planeMasks0 = { 0xf0, 0xcc, 0xaa }
let planeMasks1 = {0x0f, 0x33, 0x55 }
for (k = 0; k < 3; k++) {
   let plane0 = (parentOccupancy & planeMaks0[k]) != 0
   let plane1 = (parentOccupancy & planeMaksl[k]) != 0
   let hasSinglePlane = plane0^plane1
   PlanarRate[k] = (255 × PlanarRate[k] + 8 × 256 × hasSinglePlane +128) >> 8
}
```

At the start of parsing each geometry_octree_node syntax structure, it is determined for each axis if the current node is eligible to signal plane information. The output of this process is the array PlanarEligible, with elements PlanarEligible[k], for k=0 . . . 2.

First, PlanarRate is used to determine the order, planeOrder[k], of the three planes from most to least likely according to Table 18.

Then, PlanarEligible is set as follows:

```
for (k = 0; k < 3; k++) {
   if (EffectiveNodeSizeLog2[k] <= 0)
      PlanarEligible[k] = 0
   else if (!geom_tree_coded_axis_flag[depth][k])
      PlanarEligible[k] = 0
   else if (!geometry_planar_enabled_flag)
      PlanarEligible[k] = 0
   else if (XXX angular mode linkage XXX)
      PlanarEligible[k] = XXX
   else if (LocalDensity >= 3 × 1024
      PlanarEligible[k] = 0
   else
      PlanarEligible[k] = PlanarRate[k] >
      geom_planar_th[planeOrder[k]]
}
```

TABLE 18

Determination of the values of planeOrder [ k ] from planarRate[ k ]

| Condition | planeOrder [ 0 ] | planeOrder [ 1 ] | planeOrder [ 2 ] |
|---|---|---|---|
| PlanarRate[0] ≥ PlanarRate[1] ≥ PlanarRate[2] | 0 | 1 | 2 |
| PlanarRate[0] ≥ PlanarRate[2] > PlanarRate[1] | 0 | 2 | 1 |
| PlanarRate[1] > PlanarRate[0] ≥ PlanarRate[2] | 1 | 0 | 2 |
| PlanarRate[1] ≥ PlanarRate[2] > PlanarRate[0] | 1 | 2 | 0 |
| PlanarRate[2] > PlanarRate[0] ≥ PlanarRate[1] | 2 | 0 | 1 |
| PlanarRate[2] > PlanarRate[1] > PlanarRate[0] | 2 | 1 | 0 |

A syntax element may be signalled into the bitstream: is_planar_flag[axisIdx] equal to 1 indicates that the positions of the current node's children form a single plane perpendicular to the axisIdx-th axis.

is_planar_flag[ axisIdx] equal to 0, when present, indicates that the the positions of the current node's children occupy both planes perpendicular to the axisIdx-th axis.

The context index (ctxIdx) for coding the is_planar_flag is specified in Table 37 in GPCC DIS where it is set equal to axisIdx.

8.2.3.2 Buffer Tracking the Closest Nodes along an Axis

The arrays PlanarPrevPos, PlanarPlane, IsPlanarNode record information about previously decoded geometry tree nodes for use in the determination of ctxIdx for the syntax element plane_position. When either geometry_planar_enabled_flag is equal to 0 or planar_buffer_disabled_flag is equal to 1, the arrays are not used by the decoding process.

In this process, the variable axisIdx is used to represent one of the three coded axes, the variable axisPos represents the position of a node along the axisIdx-th axis. Values of axisPos are in the range 0 . . . 0x3fff.

The array IsPlanarNode, with values IsPlanarNode[axisIdx][axisPos] indicates whether the most recently decoded node with an axisIdx-th position component equal to axisPos is planar in the plane perpendicular to the axisIdx-th axis.

The array PlanarPrevPos, with values PlanarPrevPos[axisIdx][axisPos] storing the maximum position component of the most recently decoded node with an axisIdx-th position component equal to axisPos.

The array PlanarPlane, with values PlanarPlane[axisIdx][axisPos] indicates the value of plane_position[axisIdx] for the most recently decoded node with an axisIdx-th position component equal to axisPos.

At the start of each geometry tree level, each element of the arrays PlanarPrevPos and IsPlanarNode is initialized to 0.

XXX After decoding each geometry_planar_mode_data syntax structure with parameters childIdx and axisIdx, the arrays PlanarPrevPos, PlanarPlane and IsPlanarNode are updated as follows:

The variable axisPos representing a position along the axisIdx-th axis is derived as follows:

if (axisIdx==0) axisPos=sN & 0x3fff if (axisIdx==1) axisPos=tN & 0x3fff if (axisIdx==2) axisPos=vN & 0x3fff The array entries corresponding to the node are updated as follows:

if (axisIdx==0) maxPos=Max(tN & 0x7c0, vN & 0x7c0)>>3 if (axisIdx==1) maxPos=Max(sN & 0x7c0, vN & 0x7c0)>>3 if (axisIdx==2) maxPos=Max(sN & 0x7c0, tN & 0x7c0)>>3

PlanarPrevPos[axisIdx][axisPos]=maxPos

```
if (is_planar_flag[axisPos])

PlanarPlane[axisIdx][axisPos]=plane_position[ax-
        isIdx]

IsPlanarNode[axisIdx][axisPos]=is_planar_flag[ax-
        isIdx]
```

8.2.3.3 Determination of ctxIdx for the Syntax Element Plane_Position

The inputs to this process are:
the variable axisIdx identifying the axis normal to a plane, and
the position (sN, tN, vN) of the current node within a geometry tree level.
The output of this process is the variable ctxIdx.
The variable neighOccupied indicates whether there is a node that both neighbours the current node along the axisIdx-th axis. It is derived as follows: XXX

```
    neighOccupied=(NeighbourPattern>>2×axisIdx) &
        3[XXX Verify pattern]

adjPlaneCtxInc=neighOccupied=3?0: neighOccupied
```

When planar_buffer_disabled_flag is equal to 1, the value of ctxIdx is set equal to adjPlaneCtxInc and no further processing is performed by this process. Otherwise, the remainder of this clause applies.

The variable axisPos indicates the 14 least significant position bits of the current node along the axisIdx-th axis:

```
    if (axisIdx==0) axisPos=sN & 0x3fff if (axisIdx==1) axisPos=tN & 0x3fff if (axisIdx==2) axisPos=vN & 0x3fff
```

The variable dist represents a distance between the current node and the most recently decoded [Ed. decoded is perhaps the wrong term?] node position with the same value of axisPos along the axisIdx-th axis. It is derived as follows:

```
    a=PlanarPrevPos[axisIdx][axisPos]

if (axisIdx==0)  b=Max(tN  &  0x7c0,  vN  &
        0x7c0)>>3 if (axisIdx==1)  b=Max(sN  &  0x7c0,  vN  &
        0x7c0)>>3 if (axisIdx==2)  b=Max(sN  &  0x7c0,  tN  &
        0x7c0)>>3 dist=Abs(a−b)
```

The context index ctxIdx is derived as follows:

```
if (!IsPlanarNode[axisIdx]]axisPos]])
    ctxIdx = adjPlaneCtxInc
else {
    prevPlane = PlanarPlane[axisIdx][xisPos]
    distCtxInc = (dist > 1)
    ctxIdx = 12 × axisIdx + 4 × adjPlaneCtxInc = 2 × distCtxInc +
    prevPlane +3
  }
}
```

8.2.3.4 Determination of PlanePosIdxAzimuthalS and PlanePosIdxAzimuthalT for the Coding of the Horizontal Plane Positions

[Ed, Fix how this Interacts with ctxIdx Above. NB: ctxIdx is not Plane Independent]

The determination of planePosIdxAngularS for the arithmetic coding of plane_position[0] and of planePosIdxAngularT for the arithmetic coding of plane_position[1] is obtained as follows.

When geometry_angular_enabled_flag is equal to 0, the values of both planePosIdxAzimuthalS and planePosIdxAzimuthalT are set equal to planePosIdx. Otherwise, the following applies:

```
if (contextAzimuthal S == −1)
    planePosIdxAzimuthalS = planePosIdx
else
    planePosIdxAzimuthalS = 39 + contextAzimuthalS
if (contextAzimuthalT == −1)
    planePosIdxAzimuthalT = planePosIdx
else
    planePosIdxAzimuthalT = 39 + contextAzimuthalT
The determination of contextAngular for the arithmetic coding of
plane position[ 2 ] isperformed as described in XREF.
```

8.2.3.5 Determination of PlanePosIdxAngular for the Coding of the Vertical Plane Position

[Ed, Fix how this Interacts with ctxIdx Above. NB: ctxIdx is not Plane Independent]

The determination of planePosIdxAngular for the arithmetic coding of plane_position[2] is obtained as follows.

When geometry_angular_enabled_flag is equal to 0, the value of planePosIdxAngular is set equal to planePosIdx. Otherwise, the following applies:

```
if (contextAngular == − 1)
    planePosIdxAngular = planePosIdx
else
    planePosIdxAngular = 48 + contextAngular
The determination of contextAngular for the arithmetic coding of
plane_position[ 2 ] is performed as described in section 8.2.4.4.
```

Angular and Azimuthal Modes in GPCC DIS

Angular Mode Syntax

The syntax elements that carry the Lidar laser sensor information that are required for the angular coding mode to have any coding efficiency benefits are italics in Table 2. The semantics of these syntax elements is specified as follows in GPCC DIS:

geometry_planar_enabled_flag equal to 1 indicates that the planar coding mode is activated. geometry_planar_enabled_flag equal to 0 indicates that the planar coding mode is not activated. When not present, geometry_planar_enabled_flag is inferred to be 0.

geom_planar_th[i], for i in the range 0 . . . 2, specifies the value of the threshold of activation for planar coding mode along the i-th most probable direction for the planar coding mode to be efficient. geom_planar_th[i] is an integer in the range 0 . . . 127.

geom_idcm_rate_minus1 specifies the rate at which nodes may be eligible for direct coding. When not present, geom_idcm_rate_minus1 is inferred to be 31.

The array IdcmEnableMask is derived as follows:

```
for (i = 0, acc = 0; i < 32; i++) {
    acc += geom_idcm_rate_minus1 + 1
    IdcmEnableMask[i] = acc >, 32
    acc &= 0x1f
}
``` geometry_angular_enabled_flag equal to 1 indicates that the angular coding mode is activated. geometry_angular_enabled_flag equal to 0 indicates that the angular coding mode is not activated.

geom_slice_angular_origin_present_flag equal to 1 specifies that a slice relative angular origin is present in the geometry slice header. geom_slice_angular_origin_present_flag equal to 0 specifies that an angular origin is not present in the geometry slice header. When not present, geom_slice_angular_origin_present_flag is inferred to be 0.

geom_angular_origin_bits_minus1 plus 1 is the length in bits of the syntax elements geom_angular_origin_xyz[k].

geom_angular_origin_xyz[k] specifies the k-th component of the (x, y, z) co-ordinate of the origin used in the processing of the angular coding mode. When not present, the value of geom_angular_origin_xyz[k] with k=0 . . . 2 is inferred to be 0.

geom_angular_azimuth_scale_log 2 and geom_angular_radius_scale_log 2 specify factors used to scale positions coded using a spherical co-ordinate system during conversion to cartesian co-ordinates.

geom_angular_azimuth_step_minus1 plus 1 specifies a unit change in azimuth angle. Differential prediction residuals used in angular predictive tree coding may be partially represented as multiples of geom_angular_azimuth_step_minus1 plus 1. The value of geom_angular_azimuth_step_minus1 shall be less than (1<<geom_angular_azimuth_scale_log 2).

number_lasers_minus1 plus 1 specifies the number of lasers used for the angular coding mode.

laser_angle_init and laser_angle_diff[i] with i=0 . . . number_lasers_minus1 specify the tangent of the elevation angle of the i-th laser relative to the horizontal plane defined by the first and second coded axes.

The array LaserAngle[i] with i=0 . . . number_lasers_minus1 is derived as follows:

LaserAngle[0]=laser_angle_init if(number_lasers_minus1>0)

LaserAngle[1]=laser_angle_init+laser_angle_diff[1]

for (i=2; i<=number_lasers_minus1; i++)

LaserAngle[i]=2*LaserAngle[i-1]-LaserAngle[i-2]+laser_angle_diff[i]

It is a requirement of bitstream conformance that the value of LaserAngle[i] with i=1 . . . number_lasers_minus1 shall be greater than or equal to LaserAngle[i-1].

laser_correction_init and laser_correction_diff[i] with i=1 . . . number_lasers_minus1 specify the correction, along the second internal axis, of the i-th laser position relative to the GeomAngularOrigin[2].

laser_phi_per_turn_init_minus1 and laser_phi_per_turn_diff[i] with i=1 . . . number_lasers_minus1 specify the number of samples produced by the i-th laser of a rotating sensing system located at the origin used in the processing of the angular coding mode.

The arrays LaserCorrection[i] and LaserPhiPerTurn[i] with i=1 . . . number_lasers_minus1 are derived as follows:

```
LaserCorrection[0] = laser_correction_init
LaserPhiPerTurn[0] = laser_phi_per_turn_init_minus1 + 1
for (i = 1; i <= number_lasers_minus1; i++) {
    LaserCorrection[i] = LaserCorrection[i-1] + laser_correction_diff[i]
    LaserPhiPerTurn[i] = LaserPhiPerTurn[i-1] + laser_phi_per_turn_diff[i]
}
```

It is a requirement of bitstream conformance that the value of LaserPhiPerTurn[i] with i=0 . . . number_lasers_minus1 shall not be 0.

The arrays DeltaPhi[i] and InvDeltaPhi[i] with i=0 . . . number_lasers_minus1 are derived as follows:

```
for (i = 0; i <= number_lasers_minus1; i++) {
    DeltaPhi[i] = 6588397 / LaserPhiPerTurn[i]
    InvDeltaPhi[i] = (LaserPhiPerTurn[i] << 30) / 6588397
}
``` planar_buffer_disabled_flag equal to 1 indicates that tracking the closest nodes using a buffer is not used in process of coding the planar mode flag and the plane position in the planar mode. planar_buffer_disabled_flag equal to 0 indicates that tracking the closest nodes using a buffer is used. When not present, planar_buffer_disabled_flag is inferred to be !geometry_planar_enabled_flag.

TABLE 2

Geometry parameter set syntax.
Angular mode syntax elements are in italics.

| | Descriptor |
|---|---|
| geometry_parameter_set( ) { | |
|   gps_geom_parameter_set_id | u(4) |
|   gps_seq_parameter_set_id | u(4) |
|   gps_gsh_box_log2_scale_present_flag | u(1) |
|   if( !gps_gsh_box_log2_scale_present_flag) | |
|     gps_gs_box_log2_scale | ue(v) |
|   geom_tree_type | u(1) |
|   if( geom_tree_type == 1 ) | |
|     duplicate_points_enabled_flag | u(1) |
|   if( geom_tree_type == 0 ) { | |
|     geom_num_points_list_present_flag | u(1) |
|     duplicate_points_enabled_flag | u(1) |
|     inferred_direct_coding_mode | u(2) |
|     if( inferred_direct_coding_mode ) | |
|       joint_2point_idcm_enabled_flag | u(1) |
|     geom_tree_coded_axis_list_present_flag | u(1) |
|     log2_neighbour_avail_boundary_minus1 | u(3) |
|     if( log2_neighbour_avail_boundary_minus1 > 0 ) { | |
|       adjacent_child_contextualization_enabled_flag | u(1) |
|       log2_intra_pred_max_node_size | ue(v) |
|     } | |
|     bitwise_occupancy_coding_flag | u(1) |
|     geometry_planar_enabled_flag | u(1) |
|     if( geometry_planar_enabled_flag ){ | |
|       geom_planar_th[ 0 ] | ue(v) |
|       geom_planar_th[ 1 ] | ue(v) |
|       geom_planar_th[ 2 ] | ue(v) |
|       if( inferred_direct_coding_mode ) | |
|         geom_idcm_rate_minus1 | u(5) |
|     } | |
|   } | |

TABLE 2-continued

Geometry parameter set syntax.
Angular mode syntax elements are in italics.

| | Descriptor |
|---|---|
| *geometry_angular_enabled_flag* | u(1) |
| if( geometry_angular_enabled_flag ){ | |
|   geom_slice_angular_origin_present_flag | u(1) |
|   if( !geom_slice_angular_origin_present_flag ) { | |
|     geom_angular_origin_bits_minus1 | ue(v) |
|     for( k = 0; k < 3; k++ ) | |
|       *geom_angular_origin_xyz*[ k ] | s(v) |
|   } | |
|   *if( geom_tree_type == 1 ) {* | |
|     *geom_angular_azimuth_scale_log2* | ue(v) |
|     *geom_angular_azimuth_step_minus1* | ue(v) |
|     *geom_angular_radius_scale_log2* | ue(v) |
|   *}* | |
|   *number_lasers_minus1* | ue(v) |
|   *laser_angle_init* | se(v) |
|   *laser_correction_init* | se(v) |
|   *if( geom_tree_type == 0 )* | |
|     *laser_phi_per_turn_init_minus1* | ue(v) |
|   *for( i = 1; i <= number_lasers_minus1; i++ ) {* | |
|     *laser_angle_diff*[ i ] | se(v) |
|     *laser_correction_diff*[ i ] | se(v) |
|     *if( geom_tree_type == 0 )* | |
|       *laser_phi_per_turn_diff*[ i ] | se(v) |
|   *}* | |
|   if( geometry_planar_enabled_flag ) | |
|     planar_buffer_disabled_flag | u(1) |
| } | |
| geom_scaling_enabled_flag | u(1) |
| if( geom_scaling_enabled_flag ) { | |
|   geom_base_qp | ue(v) |
|   geom_qp_multiplier_log2 | u(2) |
|   if( geom_tree_type == 1 ) | |
|     geom_qp_offset_intvl_log2 | ue(v) |
|   else if( inferred_direct_coding_mode ) | |
|     geom_direct_coding_mode_qp_offset | se(v) |
| } | |
| gps_extension_flag | u(1) |
| if( gps_extension_flag ) | |
|   while( more_data_in_data_unit( ) ) | |
|     gps_extension_data_flag | u(1) |
| byte_alignment( ) | |
| } | |

The data syntax of the planar mode and direct mode is included in Table 3 and Table 4, respectively.

TABLE 3

Geometry octree mode data syntax

| | Descriptor |
|---|---|
| geometry_node( depth, nodeIdx, sN, tN, vN ) { | |
|   if( depth == GeomScalingDepth ) { | |
|     geom_node_qp_offset_abs_gt0_flag | ae(v) |
|     if( geom_node_qp_offset_abs_gt0_flag ) { | |
|       geom_node_qp_offset_sign_flag | ae(v) |
|       geom_node_qp_offset_abs_minus1 | ae(v) |
|     } | |
|   } | |
|   if( geometry_planar_enabled_flag ) | |
|     for( axisIdx = 0; axisIdx < 3; axisIdx++ ) | |
|       if( PlanarEligible[ axisIdx ] ) { | |
|         is_planar_flag[ axisIdx ] | ae(v) |
|         if( is_planar_flag[ axisIdx ] ) | |
|           plane_position[ axisIdx ] | ae(v) |
|       } | |
|   if( DirectModeFlagPresent ) | |
|     direct_mode_flag | ae(v) |
|   if( direct_mode_flag ) | |
|     geometry_direct_mode_data( ) | |
|   else { | |
|     if( OccupancyIdxMaybePresent ) | |

TABLE 3-continued

Geometry octree mode data syntax

| | Descriptor |
|---|---|
|       single_child_flag | ae(v) |
|     if( single_child_flag ) | |
|       for( k = 0; k < 3; k++ ) | |
|         if( ! isPlanar[ k ] ) | |
|           occupancy_idx[ k ] | ae(v) |
|     if( OccupancyMapPresent ) | |
|       if( bitwise_occupancy_flag ) | |
|         occupancy_map | ae(v) |
|       else | |
|         occupancy_byte | de(v) |
|     if( LeafNode && duplicate_points_enabled_flag ) | |
|       for( child = 0; child < NumChildren; child++ ) { | |
| [Ed: there are two instances of dup_point_cnt_gt0_flag, they are the same flag, but signalled in different places . . . ] | |
|         dup_point_cnt_gt0_flag[ child ] | ae(v) |
|         if( dup_point_cnt_gt0_flag[ child ] ) | |
|           dup_point_cnt_minus1 [ child ] | ae(v) |
|       } | |
|   } | |
| } | |

TABLE 4

Direct mode data syntax

| | Descriptor |
|---|---|
| geometry_direct_mode_data( ) { | |
|   direct_point_cnt_eq2_flag | ae(v) |
|   if( duplicate_points_enabled_flag && | |
|   !direct_point_cnt_eq2_flag ) { | |
|     dup_point_cnt_gt0_flag | ae(v) |
|     if( dup_point_cnt_gt0_flag ) { | |
|       dup_point_cnt_gt1_flag | ae(v) |
|       if( dup_point_cnt_gt1_flag ) | |
|         dup_point_cnt_minus2 | ae(v) |
|     } | |
|   } | |
|   if( joint_2point_idcm_enabled_flag && | |
|   direct_point_cnt_eq2_flag ) | |
|     geometry_direct_mode_joint_2points( ) | |
|   for( i = 0; i <= direct_point_cnt_eq2_flag; i++ ) { | |
|     if( geometry_angular_enabled_flag ) | |
|       geometry_direct_mode_angular( i ) | |
|     else | |
|       for(k = 0; k < 3; k++ ) | |
|         geometry_direct_mode_offset( i, k ) | |
|   } | |
| } | |

8.2.4.1 Derivation Process of the Angular Eligibility for a Node

XXX Inputs/Outputs

If geometry_angular_enabled_flag is equal to 0, angular_eligible is set to equal to 0. Otherwise, the following applies:

The variable deltaAngle specifying the minimum angular distance between the lasers is derived as follows:

```
deltaAngle = 128 << 18
for(i=0; i<number_lasers_minus1; i++){
    delta = LaserAngle[i + 1] − LaserAngle[i]
    if ( deltaAngle > delta )
        deltaAngle = delta
}
```

Finally, angular_eligible is derived as follows: [Ed, sNchild needs checking]

```
midNodeS = 1 << (Max(1, ChildNodeSizeLog2[0]) - 1)
midNodeT = 1 << (Max(1, ChildNodeSizeLog2[1]) - 1)
sLidar = Abs(((sNchild - GeomAngularOrigin[0] + midNodeS) << 8) - 128)
tLidar = Abs(((tNchild - GeomAngularOrigin[1] + midNodeT) << 8) - 128)
rL1 = (sLidar + tLidar) >> 1
deltaAngleR = deltaAngle × rL1
midNodeV = 1 << (Max(1, ChildNodeSizeLog2[2]) - 1)
if ( number_lasers_minus1 > 0 && deltaAngleR <= (midNodeV << 26))
   angular_eligible = 0
else
   angular_eligible = 1
```

8.2.4.2 Derivation Process of Laser Index laserIndex Associated with a Node

XXX Inputs/Outputs

If the angular elibiligility angular_eligible is equal to 0, then laserIndex index is set to a preset value UNKOWN_LASER.

Otherwise, if the angular elibiligility angular_eligible is equal to 1, the following applies as a continuation of the process described in 8.2.5.1.

Firstly, the inverse rInv of the radial distance of the current node from the Lidar is determined as follows:

r2=sLidar×sLidar+tLidar×tLidar rInv=invSqrt(r2)

Then an angle theta32 is determined as follows:

vLidar=((vNchild−GeomAngularOrigin[2]+midNodeT)<<1)−1 theta=vLidar×rInv theta32=theta>=0?theta>>15: −((−theta)>>15)

[Ed XXX: laserIndex[Parent] is meaningless, need to add another state array]

Finally, the angular edibility and the associated laser are determined as follows, based on the parent node, Parent.

```
laserIndex = UNKOWN_LASER
if (!number_lasers_minus1)
   laserIndex = 0
else if (laserIndex[Parent] == UNKOWN_LASER || deltaAngleR <= (midNodeV <<
(26 + 2))) {
  for (i = 1; i < number_lasers_minus1; i++)
    if (LaserAngle[i] > theta32)
      break
    if (theta32 - LaserAngle[i−1] <= LaserAngle[i] − theta32)
      i−−
  laserIndex = LaserAngle[i]
}
```

8.2.4.3 Derivation Process of the Contexts ContextAzimuthalS and ContextAzimuthalT for Planar Coding Mode XXX Inputs/Outputs The following applies as a continuation of the process described in 8.2.5.2.

Firstly, two angles are deduced from the node position relative to the angular origin sPos=sNchild−GeomAngularOrigin[0] XXX tPos=tNchild−GeomAngularOrigin[1]

phiNode=iAtan2(tPos+midNodeT, sPos+midNodeS);

phiNode0=iAtan2(tPos, sPos);

Secondly, an azimuthal predictor is obtained from the array phiBuffer predPhi=phiBuffer[laserIndex]

if (predPhi==0x80000000)

predPhi=phiNode

The two azimuthal contexts are initialized as follows contextAzimuthalS=−1 contextAzimuthalT=−1

Then, if the predictor predPhi is not equal to 0x80000000, the following applies to refine the two azimuthal contexts Nshift=((predPhi−phiNode)*InvDeltaPhi[laserIndex]+536870912)>>30 predPhi−=DeltaPhi[laserIndex]*Nshift angleL=phiNode0−predPhi angleR=phiNode−predPhi contextAnglePhi=(angleL>=0 && angleR>=0)||(angleL<0 && angleR<0)?2:0 angleL=Abs(angleL)

angleR=Abs(angleR)

```
if (angleL > angleR) {
   contextAnglePhi++
   int temp = angleL
   angleL = angleR
   angleR = temp
}
if (angleR > (angleL << 2))
   contextAnglePhi += 4
```

```
       if (Abs(sPos) <= Abs(tPos))
           contextAzimuthalS = contextAnglePhi
       else
           contextAzimuthalT = contextAnglePhi
```

8.2.4.4 Derivation Process of the Context ContextAngular for Planar Coding Mode

XXX Inputs/Outputs

If the laser index laserIndex is equal to UNKOWN_LASER, then contextAngular is set to a preset value UNKOWN_CONTEXT. Otherwise, if the laser index laserIndex is not equal to UNKOWN_LASER, the following applies as a continuation of the process described in 8.2.5.2.

Firstly, two angular differences thetaLaserDeltaBot and thetaLaserDeltaTop relative to a lower plane and an upper plane are determined.

thetaLaserDelta=LaserAngle[laserIndex]−theta32

Hr=LaserCorrection[laserIndex]×rInv;

thetaLaserDelta+=Hr>=0?−(Hr>>17):((−Hr)>>17)

vShift=(rInv<<ChildNodeSizeLog2[2])>>20 XXX thetaLaserDeltaTop=thetaLaserDelta−vShift thetaLaserDeltaBot=thetaLaserDelta+vShift Then, the angular context is deduced from the two angular differences.

contextAngular=thetaLaserDelta<0 if (thetaLaserDeltaTop>=0||thetaLaserDeltaBot<0)

contextAngular+=2

GPCC's Motion prediction. There are two kinds of motion involved in G-PCC InterEM software (Exploratory model for inter-prediction in G-PCC, ISO/IEC JTC1/SC29 WG11 N18096, Macau, CN, October 2018), global motion matrix and local node motion vector. Global motion parameters are defined as a rotation matrix and translation vector which will be applied on all the points (except the points being applied local motion mode) in prediction (reference) frame. Local node motion vector of a node of the octree is a motion vector that is only applied on points within the node in prediction (reference) frame. Details of motion estimation algorithm in InterEM is described below.

Figure 4:
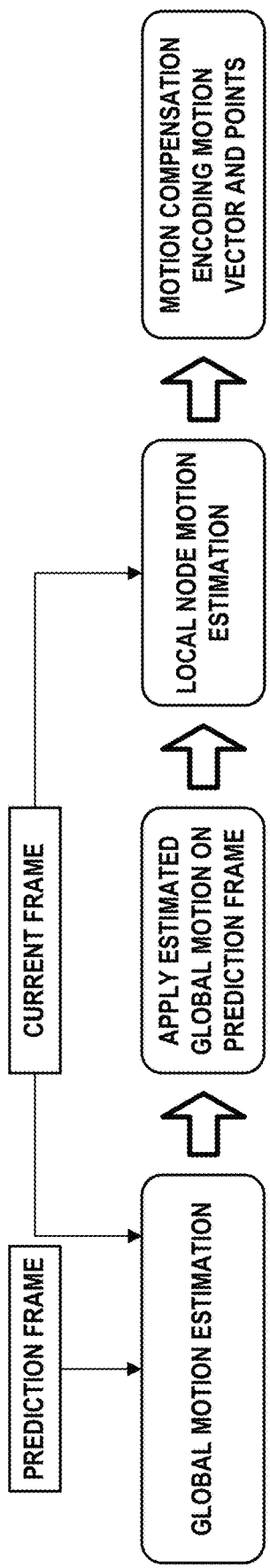
FIG. 4 is a flowchart illustrating an example motion estimation technique for InterEM.

FIG. 4 is a flowchart illustrating an example motion estimation technique for InterEM. Given input prediction (reference) frame and current frame, global motion is estimated first at a global scale. After applying global motion on prediction, local motion is estimated at a finer scale, node level in octree. Finally, the estimated local node motion is applied in motion compensation.

Details of the above technique are described below.

Figure 5:
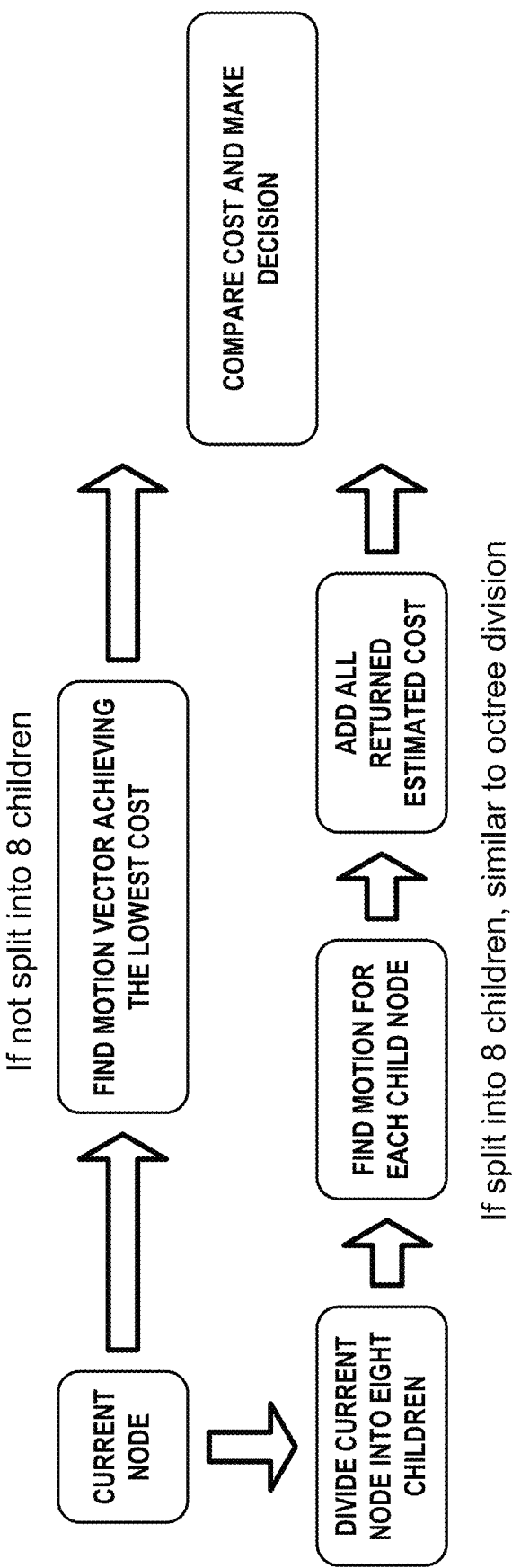
FIG. 5 is a flowchart illustrating an example technique for estimation of local node motion vector.

Method to estimate global motion matrix and translation vector. FIG. 5 is a flowchart illustrating an example technique for estimation of local node motion vector. As shown in FIG. 5, the motion vector is estimated in a recursive manner. The cost function used for choosing the best suitable motion vector may be based on the Rate-Distortion cost.

If a current node is not split into 8 children, the motion vector that could result in the lowest cost between current node and prediction node is determined. If the current node is divided into 8 children, the motion estimation algorithm is applied and the total cost under split condition is obtained by adding the estimated cost value of each child node. The decision whether to split or not to split is arrived by comparing the cost between splitting and not splitting; if split, each sub-node is assigned its respective the motion vector (or may be further split to its children), if not split, the current node is assigned the motion vector.

Two parameters that affect the performance of motion vector estimation are block size (BlockSize) and minimum prediction unit size (MinPUSize). BlockSize defines the upper bound of node size to apply motion vector estimation and MinPUSize defines the lower bound.

The above-described techniques may present one or more disadvantages. The reference block of a node is derived by motion compensation using the estimated motion information (rotation and translation). A good estimation of motion information leads to a high correlation in geometry structure terms, such as occupancy, planar information between the current node and the reference node. Therefore, utilizing this geometry information of the reference node will improve the coding performance of the current node. In accordance with one or more techniques of this disclosure, a G-PCC coder (e.g., G-PCC encoder 200 or G-PCC decoder 300) may utilize the information of a reference block in coding of the planar information of the current node. As one examples, the G-PCC coder may utilize the information of the reference block in eligibility of a node for planar coding mode, selection of contexts in coding the planar flag and plane index. One or more techniques disclosed in this document may be applied independently or combined.

Planar eligibility of a node using inter prediction. In one example, the PlanarRate may be updated by a factor (R) which depends on the planar information of the reference block. In this example, the PlanarRate in Section 8.2.3.1 in GPCC DIS may be specified as (additions shown in *bold italics*):

The parent node's occupancy information is used to determine, along each axis, the presence of a single occupied plane and to update the corresponding planar probability estimate PlanarRate[k].

```
let parentOccupancy = GeometryNodeOccupancy [depth − 1][sNp][tNp][vNp]
let planeMasks0 = { 0xf0, 0xcc, 0xaa }
let planeMasks1 = { 0x0f, 0x33, 0x55 }
for (k = 0; k < 3; k++) {
   let plane0 = (parentOccupancy & planeMaks0[k]) != 0
   let plane1 = (parentOccupancy & planeMaks1[k]) != 0
   let hasSinglePlane = plane   plane1
   PlanarRate[k] = R[k] × (255 × PlanarRate[k] + 256 × hasSinglePlane + 128) >> 8
}
```

*Where R[k] is the scaling factor which depends on whether the reference block is planar mode in the $k^{th}$ direction.*

*In one example, if the refere nce block is planar in $k^{th}$ direction, R[k] may be set higher than 1. Otherwise, R[k] may be set lower than 1.*

In another example, the PlanarEligible may be not allowed if the reference block is not planar.

Then, PlanarEligible is set as follows:

```
for (k = 0; k < 3; k++) {
  if (EffectiveNodeSizeLog2[k] <= 0)
    PlanarEligible[k] = 0
  else if (!geom_tree_coded_axis_flag[depth][k])
    PlanarEligible[k] = 0
  else if (!geometry_planar_enabled_flag)
    PlanarEligible[k] = 0
  else if (XXX angular mode linkage XXX)
    PlanarEligible[k] = XXX
  else if (LocalDensity >= 3 x 1024)
    PlanarEligible[k] = 0
  else if (!PlanarModeRef[k])
    PlanarEligible[k]=0
  else
    PlanarEligible[k] = PlanarRate[k] > geom_planar_th[planeOrder[k]]
}
```

Alternatively, a reference planar rate (PlanarRateRef) may be determined separately based on the planarity of the reference block. The eligibility of the current node for planar mode may be in addition determined based on comparing the reference planar rate with thresholds. For example:

Then, PlanarEligible is set as follows:

```
for (k = 0; k < 3; k++) 1
  if (EffectiveNodeSizeLog2[k] <= 0)
    PlanarEligible[k] = 0
  else if (!geom_tree_coded_axis_flag[depth][k])
    PlanarEligible[k] = 0
  else if (!geometry_planar_enabled_flag)
    PlanarEligible[k] = 0
  else if (XXX angular mode linkage XXX)
    PlanarEligible[k] = XXX
  else if (LocalDensity >= 3 x 1024)
    PlanarEligible[k] = 0
  else
    PlanarEligible[k] =(PlanarRate[k] >geom_planar_th[planeOrder[k]])  and/or
  (PlanarRateRef[k] >geom_planar_th ref[planeOrder[k]]
}
```

In some cases, the plane index positions are derived based on the plane index positions of the reference node. In some cases, this decision may be based on a threshold comparison.

Planar copy mode (PCM). A G-PCC coder may signal a flag (PCM flag) in the bitstream to indicate whether the current node and the reference node share the same planar mode in all the directions (e.g., k=0 . . . 2). When this flag is 1, the decoder may not need to decode planar flag for each direction, and it only use the corresponding value in the reference node (e.g., the planar flag may be copied from the reference node). When the flag is 0, the planar flag in each direction may be signalled.

At further level of PCM flag, it may also indicate whether the current node and reference node share the plane position index. In this example, if the PCM flag is 1, in the k-th direction, the decoder does not need to decode the plane position index and it may use the plane index in the reference block at the same k-th direction.

In some examples, the PCM flag may be conditionally signalled. For example, the occupancy of the reference block is 0, the PCM flag may not be signalled and may be implicitly set to be 0. In some examples, a flag in slice header, or SPS header may be defined to activate or deactivate the PCM mode.

Context selection in signaling of planar flag using inter prediction. There may be three contexts for signalling the planar flag (is_planar_flag). The selection of the index is simply selected by the direction index (axisIdx). In accordance with one or more techniques of this disclosure, the context to encode the planar flag may be extended using the planar mode of the reference node. An example of the extension may be described as follows:

The inputs to this process are:

the variable childIdx identifying the child of the current node, the variable axisIdx identifying the axis normal to a plane, and the position (sN, tN, vN) of the current node within a geometry tree level.

The output of this process is the variable ctxIdx. The value of ctxIdx is set equal to (2*axisIdx+ *PlanarModeRef[ axisIdx ]* ) and no further processing is performed.

In this example, *PlanarModeRef[ axisIdx ]* indicates whether the reference node is planar in the axisIdx direction.

CtxIdx determination for the syntax element plane_position using inter mode. In GPCC DIS, the context index used to encode the plane_position is a function of axisIdx, the plane position prediction based on neighbour occupancy, Buffer lookup to determine closest already coded node at same buffer row index contains isPlanar, planePosition, distance measure as follows (Section 8.2.3.3):

The context index ctxIdx is derived as follows:

```
if (!IsPlanarNode[axisIdx][axisPos]])
   ctxIdx = adjPlaneCtxInc
else {
   prevPlane = PlanarPlane[axisIdx][axisPos]
   distCtxInc = (dist > 1)
   ctxIdx = 12 × axisIdx + 4 × adjPlaneCtxInc + 2 × distCtxInc + prevPlane + 3
}
```

In one example of this disclosure, the occupancy and the planar mode of the reference block may be used as additional parameters to decide the context index of plane position coding.

Let PlanarModeRef and RefPlane be the planar mode and the plane position in the reference block.

If PlanarModeRef[axisIdx] is 0, RefPlane[axisIdx] is set equal to −1.

In an example, RefPlane[axisIdx] may be used to replace prevPlane:

ctxIdx=*9 × axisIdx + 3 × adjPlateCtxInc +*
*(RefPlane[axisIdx]* +1)+3

In another example, the ctxIdx may be updated as follows.

ctxIdx=(12×axisIdx+4×adjPlaneCtxInc+2×distCtx-
Inc+prevPlane+3)+
*(RefPlane[axisIdx] + 1) × N* where N be the number of contexts supported using only axisIdx, adjPlaneCtxInc, distCtxInc, and prevPlane. In the current draft GPCC DIS, N is 36.

In another example, the occupancy and plane position of the reference block may be used to replace the neighbour occupancy for deriving the context.

In also another example, the context index for the planar flag may be derived using only the direction index and the planar mode of the reference block as follows:

ctxIdx=*3 × axisIdx +*
*(RefPlane[axisIdx] + 1)* +3

Derivation process of the context contextAngular for planar coding mode using inter prediction. Let M be the number of contexts supported for contextAngular to code plane position. After contextAngular is derived as in Section 3.3.5, it may be updated using the planar mode of and planar position of the reference block.

In an example, contextAngular in Section 3.3.5 may be updated as follows:

In some cases, If PlanarModeRef[axisIdx] is 0, RefPlane [axisIdx] is set equal to −1. The contextAngular values may be assigned as follows:

Then, the angular context is deduced from the two angular differences.

contextAngular=thetaLaserDelta<0 if (thetaLaserDeltaTop>=0||thetaLaserDeltaBot<0)

contextAngular+=2

*contextAngular = 4 ×*
*(RefPlane[axisIdx] + 1)*
*+ contextAngular*

In another example, If PlanarModeRef[axisIdx] is 0, RefPlane[axisIdx] is set equal to 0.

The contextAngular values may be assigned as follows: Then, the angular context is deduced from the two angular differences.

contextAngular=thetaLaserDelta<0 if (thetaLaserDeltaTop>=0||thetaLaserDeltaBot<0)

contextAngular+=2

*contextAngular = 4 ×*
*(RefPlane[axisIdx])*
*+ contextAngular*

Derivation process of the contexts contextAzimuthalS and contextAzimuthalT combined with inter prediction for planar coding mode.

After the contexts contextAzimuthalS and contextAzimuthalT are derived in 8.2.4.3, they may be updated with the use of the planar mode of the inter reference block.

In some cases, If PlanarModeRef[axisIdx] is 0, RefPlane [axisIdx] is set equal to −1. The follow modification may be made:

```
if (Abs(sPos) <= Abs(tPos))
   contextAzimuthalS = contextAnglePhi+ 8 × (RefPlane [axisIdx] + 1)
else
   contextAzimuthalT = contextAnglePhi+ 8 × (RefPlane [axisIdx] + 1)
```

In some cases, If PlanarModeRef[axisIdx] is 0, RefPlane [axisIdx] is set equal to 0. The follows modification may be made:

```
if (Abs(sPos) <= Abs(tPos))
   contextAzimuthalS = contextAnglePhi+ 8 × (RefPlane [axisIdx])
else
   contextAzimuthalT = contextAnglePhi+ 8 × (RefPlane [axisIdx])
```

Context occupancy coding with the inter prediction.

In the reference software for InterEM, the context derivation for occupancy bit is derived as follows:

int ctxIdxMapIdx=4*idxAdj

/*intra prediction*/

+bitIsPredicted+bitPrediction

/*inter prediction*/

```
+!!mappedPred+bitPred+bitPredStrong;

auto& ctxIdxMap=_ctxIdxMaps[ctxIdxMapIdx];
```

```
if (i < 7 || partialOccupancy) {
    int ctxIdx = ctxIdxMap [i][idx];
    bit = _arithmeticDecoder->decode(_ctxOccupancy[ctxIdx]);
}
```

In above calculation, the context associated with the inter prediction (ctxInter) is the sum of !!mappedPred, bitPred, bitPredStrong. In accordance with one or more techniques of this disclosure, ctxIdxMapIdx may be modified as:

```
int ctxIdxMapIdx=8*idxAdj

/*intra prediction*/+ bitIsPredicted+bitPrediction

/*inter prediction*/+

+((!!mappedPred)<<2)+(bitPred<<1)+bitPredStrong);
```

Motion based thresholds. A threshold may be defined based on the motion vector/motion parameters; this threshold may be used in one or more determination that are disclosed in this document.

For example, a threshold may be determined based on a magnitude/parameter associated with the rotation (e.g., angle of rotation) or translation (e.g., magnitude of translation); if an angle associated with rotation is x and the magnitude of the translation is y, then the threshold may be derived as a function of x and y (e.g., a linear combination a*x+b*y, where a and b are fixed values).

In other alternatives, the threshold associated with each axis may be derived separately; e.g., translation associated with the axis may be used to derive the threshold associated with the axis.

Based on the threshold value, one or more determinations may be conducted. For example, a point is associated with zero motion, a threshold associated with zero motion may be used to determine planar eligibility of node (as discussed above with regard to PCM); when motion associated with a point is larger, a different threshold may be used to for planar eligibility determination.

In another example, one or more determinations disclosed in this document may be disabled when the threshold (or motion parameters) exceeds a particular fixed value.

For different determinations, different thresholds may be used. The thresholds may also be signalled in the bitstream.

Examples in the various aspects of this disclosure may be used individually or in any combination.

Figure 6:
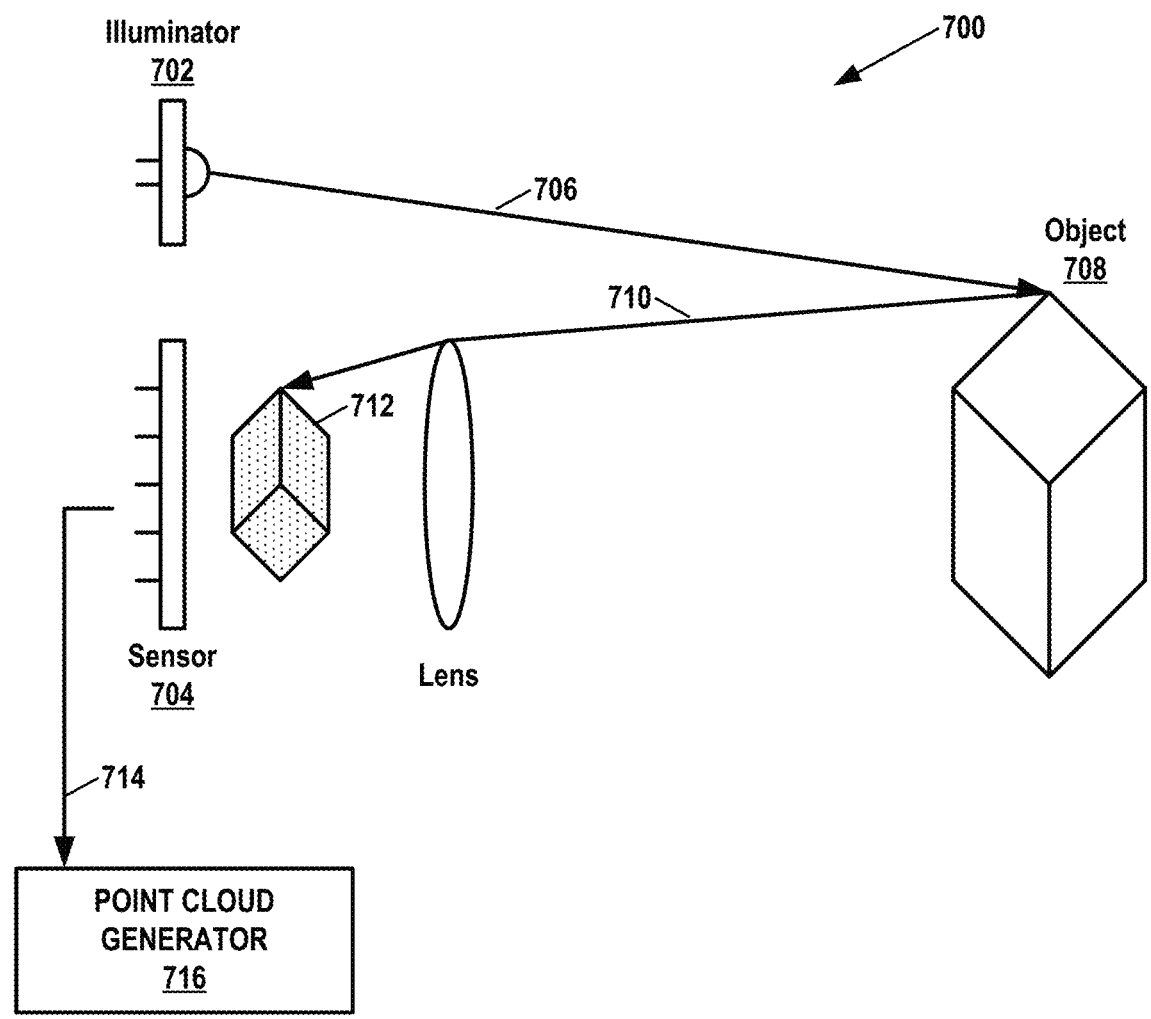
FIG. 6 is a conceptual diagram illustrating an example range-finding system that may be used with one or more techniques of this disclosure.

FIG. 6 is a conceptual diagram illustrating an example range-finding system 700 that may be used with one or more techniques of this disclosure. In the example of FIG. 6, range-finding system 700 includes an illuminator 702 and a sensor 704. Illuminator 702 may emit light 706. In some examples, illuminator 702 may emit light 706 as one or more laser beams. Light 706 may be in one or more wavelengths, such as an infrared wavelength or a visible light wavelength. In other examples, light 706 is not coherent, laser light. When light 706 encounters an object, such as object 708, light 706 creates returning light 710. Returning light 710 may include backscattered and/or reflected light. Returning light 710 may pass through a lens 711 that directs returning light 710 to create an image 712 of object 708 on sensor 704. Sensor 704 generates signals 714 based on image 712. Image 712 may comprise a set of points (e.g., as represented by dots in image 712 of FIG. 6).

In some examples, illuminator 702 and sensor 704 may be mounted on a spinning structure so that illuminator 702 and sensor 704 capture a 360-degree view of an environment (e.g., a spinning LIDAR sensor). In other examples, range-finding system 700 may include one or more optical components (e.g., mirrors, collimators, diffraction gratings, etc.) that enable illuminator 702 and sensor 704 to detect ranges of objects within a specific range (e.g., up to 360-degrees). Although the example of FIG. 6 only shows a single illuminator 702 and sensor 704, range-finding system 700 may include multiple sets of illuminators and sensors.

In some examples, illuminator 702 generates a structured light pattern. In such examples, range-finding system 700 may include multiple sensors 704 upon which respective images of the structured light pattern are formed. Range-finding system 700 may use disparities between the images of the structured light pattern to determine a distance to an object 708 from which the structured light pattern backscatters. Structured light-based range-finding systems may have a high level of accuracy (e.g., accuracy in the sub-millimeter range), when object 708 is relatively close to sensor 704 (e.g., 0.2 meters to 2 meters). This high level of accuracy may be useful in facial recognition applications, such as unlocking mobile devices (e.g., mobile phones, tablet computers, etc.) and for security applications.

In some examples, range-finding system 700 is a time of flight (ToF)-based system. In some examples where range-finding system 700 is a ToF-based system, illuminator 702 generates pulses of light. In other words, illuminator 702 may modulate the amplitude of emitted light 706. In such examples, sensor 704 detects returning light 710 from the pulses of light 706 generated by illuminator 702. Range-finding system 700 may then determine a distance to object 708 from which light 706 backscatters based on a delay between when light 706 was emitted and detected and the known speed of light in air). In some examples, rather than (or in addition to) modulating the amplitude of the emitted light 706, illuminator 702 may modulate the phase of the emitted light 706. In such examples, sensor 704 may detect the phase of returning light 710 from object 708 and determine distances to points on object 708 using the speed of light and based on time differences between when illuminator 702 generated light 706 at a specific phase and when sensor 704 detected returning light 710 at the specific phase.

In other examples, a point cloud may be generated without using illuminator 702. For instance, in some examples, sensors 704 of range-finding system 700 may include two or more optical cameras. In such examples, range-finding system 700 may use the optical cameras to capture stereo images of the environment, including object 708. Range-finding system 700 may include a point cloud generator 716 that may calculate the disparities between locations in the stereo images. Range-finding system 700 may then use the disparities to determine distances to the locations shown in the stereo images. From these distances, point cloud generator 716 may generate a point cloud.

Sensors 704 may also detect other attributes of object 708, such as color and reflectance information. In the example of FIG. 6, a point cloud generator 716 may generate a point cloud based on signals 714 generated by sensor 704. Range-finding system 700 and/or point cloud generator 716 may form part of data source 104 (FIG. 1). Hence, a point cloud generated by range-finding system 700 may be encoded and/or decoded according to any of the techniques of this disclosure.

Figure 7:
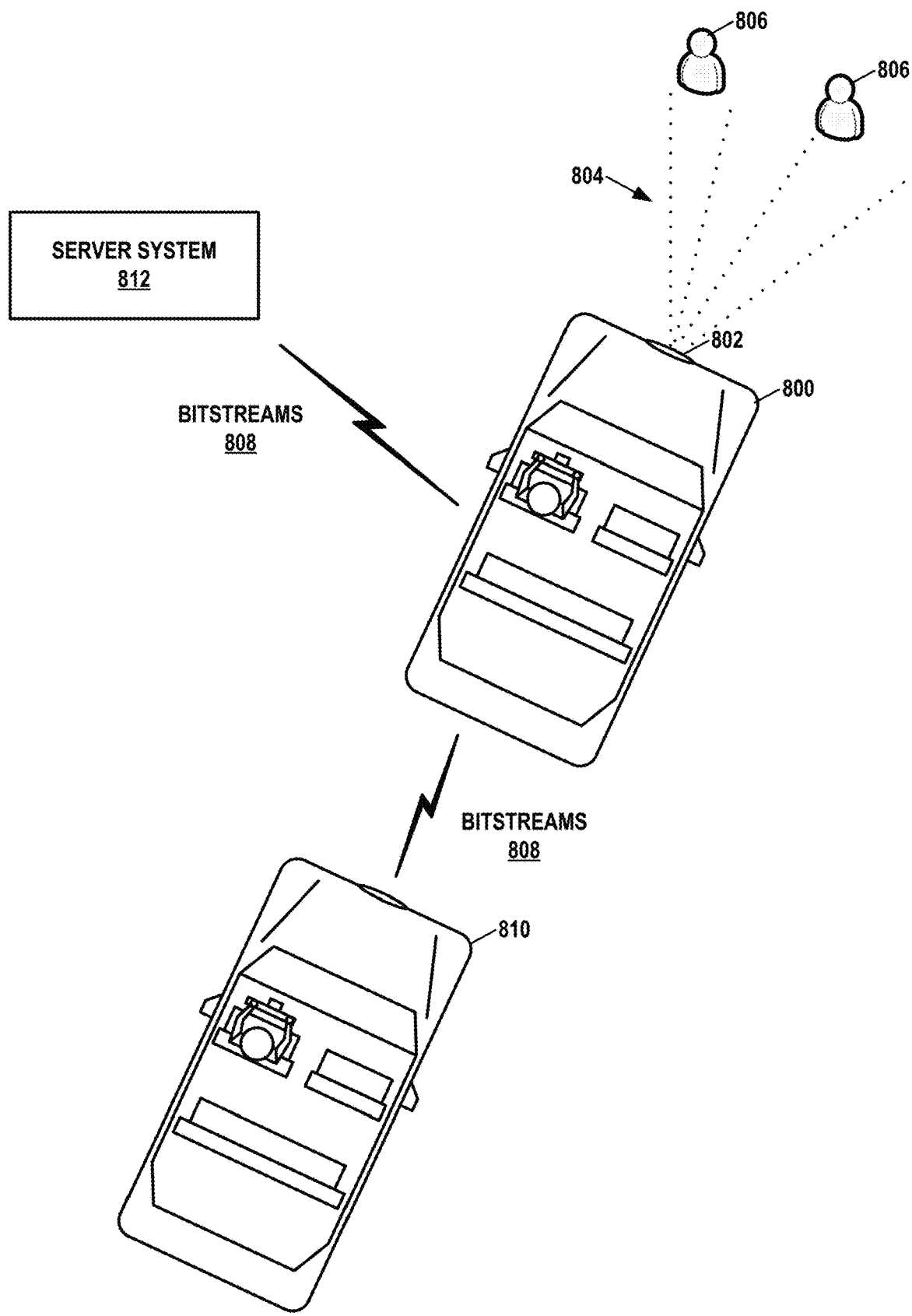
FIG. 7 is a conceptual diagram illustrating an example vehicle-based scenario in which one or more techniques of this disclosure may be used.

FIG. 7 is a conceptual diagram illustrating an example vehicle-based scenario in which one or more techniques of this disclosure may be used. In the example of FIG. 7, a vehicle 800 includes a range-finding system 802. Range-finding system 802 may be implemented in the manner discussed with respect to FIG. 107. Although not shown in the example of FIG. 7, vehicle 800 may also include a data source, such as data source 104 (FIG. 1), and a G-PCC encoder, such as G-PCC encoder 200 (FIG. 1). In the example of FIG. 7, range-finding system 802 emits laser beams 804 that reflect off pedestrians 806 or other objects in a roadway. The data source of vehicle 800 may generate a point cloud based on signals generated by range-finding system 802. The G-PCC encoder of vehicle 800 may encode the point cloud to generate bitstreams 808, such as geometry bitstream (FIG. 2) and attribute bitstream (FIG. 2). Bitstreams 808 may include many fewer bits than the unencoded point cloud obtained by the G-PCC encoder.

An output interface of vehicle 800 (e.g., output interface 108 (FIG. 1) may transmit bitstreams 808 to one or more other devices. Bitstreams 808 may include many fewer bits than the unencoded point cloud obtained by the G-PCC encoder. Thus, vehicle 800 may be able to transmit bitstreams 808 to other devices more quickly than the unencoded point cloud data. Additionally, bitstreams 808 may require less data storage capacity.

In the example of FIG. 7, vehicle 800 may transmit bitstreams 808 to another vehicle 810. Vehicle 810 may include a G-PCC decoder, such as G-PCC decoder 300 (FIG. 1). The G-PCC decoder of vehicle 810 may decode bitstreams 808 to reconstruct the point cloud. Vehicle 810 may use the reconstructed point cloud for various purposes. For instance, vehicle 810 may determine based on the reconstructed point cloud that pedestrians 806 are in the roadway ahead of vehicle 800 and therefore start slowing down, e.g., even before a driver of vehicle 810 realizes that pedestrians 806 are in the roadway. Thus, in some examples, vehicle 810 may perform an autonomous navigation operation based on the reconstructed point cloud.

Additionally or alternatively, vehicle 800 may transmit bitstreams 808 to a server system 812. Server system 812 may use bitstreams 808 for various purposes. For example, server system 812 may store bitstreams 808 for subsequent reconstruction of the point clouds. In this example, server system 812 may use the point clouds along with other data (e.g., vehicle telemetry data generated by vehicle 800) to train an autonomous driving system. In other example, server system 812 may store bitstreams 808 for subsequent reconstruction for forensic crash investigations.

Figure 8:
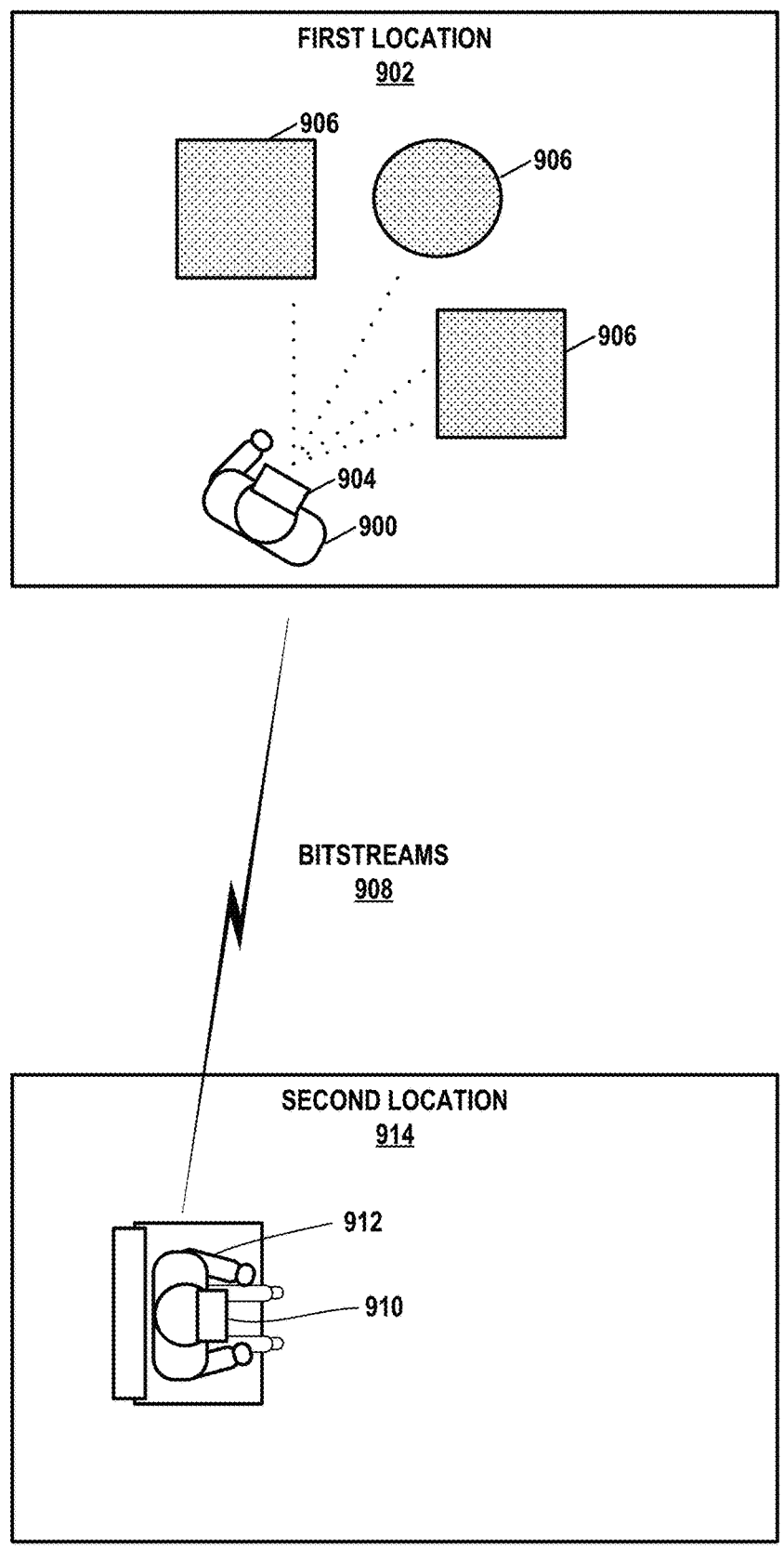
FIG. 8 is a conceptual diagram illustrating an example extended reality system in which one or more techniques of this disclosure may be used.

FIG. 8 is a conceptual diagram illustrating an example extended reality system in which one or more techniques of this disclosure may be used. Extended reality (XR) is a term used to cover a range of technologies that includes augmented reality (AR), mixed reality (MR), and virtual reality (VR). In the example of FIG. 8, a user 900 is located in a first location 902. User 900 wears an XR headset 904. As an alternative to XR headset 904, user 900 may use a mobile device (e.g., mobile phone, tablet computer, etc.). XR headset 904 includes a depth detection sensor, such as a range-finding system, that detects positions of points on objects 906 at location 902. A data source of XR headset 904 may use the signals generated by the depth detection sensor to generate a point cloud representation of objects 906 at location 902. XR headset 904 may include a G-PCC encoder (e.g., G-PCC encoder 200 of FIG. 1) that is configured to encode the point cloud to generate bitstreams 908.

XR headset 904 may transmit bitstreams 908 (e.g., via a network such as the Internet) to an XR headset 910 worn by a user 912 at a second location 914. XR headset 910 may decode bitstreams 908 to reconstruct the point cloud. XR headset 910 may use the point cloud to generate an XR visualization (e.g., an AR, MR, VR visualization) representing objects 906 at location 902. Thus, in some examples, such as when XR headset 910 generates an VR visualization, user 912 may have a 3D immersive experience of location 902. In some examples, XR headset 910 may determine a position of a virtual object based on the reconstructed point cloud. For instance, XR headset 910 may determine, based on the reconstructed point cloud, that an environment (e.g., location 902) includes a flat surface and then determine that a virtual object (e.g., a cartoon character) is to be positioned on the flat surface. XR headset 910 may generate an XR visualization in which the virtual object is at the determined position. For instance, XR headset 910 may show the cartoon character sitting on the flat surface.

Figure 9:
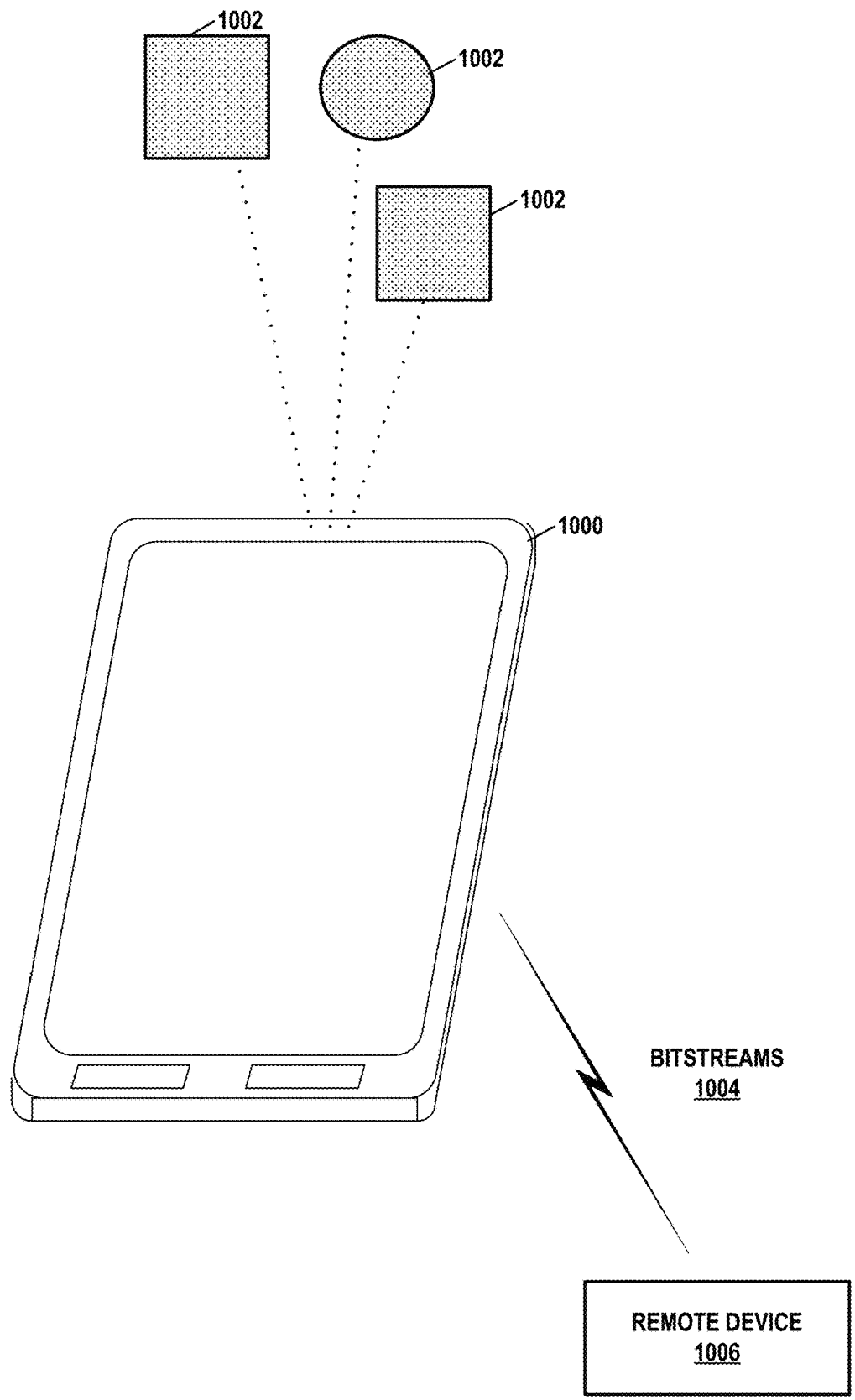
FIG. 9 is a conceptual diagram illustrating an example mobile device system in which one or more techniques of this disclosure may be used.

FIG. 9 is a conceptual diagram illustrating an example mobile device system in which one or more techniques of this disclosure may be used. In the example of FIG. 9, a mobile device 1000 (e.g., a wireless communication device), such as a mobile phone or tablet computer, includes a range-finding system, such as a LIDAR system, that detects positions of points on objects 1002 in an environment of mobile device 1000. A data source of mobile device 1000 may use the signals generated by the depth detection sensor to generate a point cloud representation of objects 1002. Mobile device 1000 may include a G-PCC encoder (e.g., G-PCC encoder 200 of FIG. 1) that is configured to encode the point cloud to generate bitstreams 1004. In the example of FIG. 9, mobile device 1000 may transmit bitstreams to a remote device 1006, such as a server system or other mobile device. Remote device 1006 may decode bitstreams 1004 to reconstruct the point cloud. Remote device 1006 may use the point cloud for various purposes. For example, remote device 1006 may use the point cloud to generate a map of environment of mobile device 1000. For instance, remote device 1006 may generate a map of an interior of a building based on the reconstructed point cloud. In another example, remote device 1006 may generate imagery (e.g., computer graphics) based on the point cloud. For instance, remote device 1006 may use points of the point cloud as vertices of polygons and use color attributes of the points as the basis for shading the polygons. In some examples, remote device 1006 may use the reconstructed point cloud for facial recognition or other security applications.

Figure 10A:
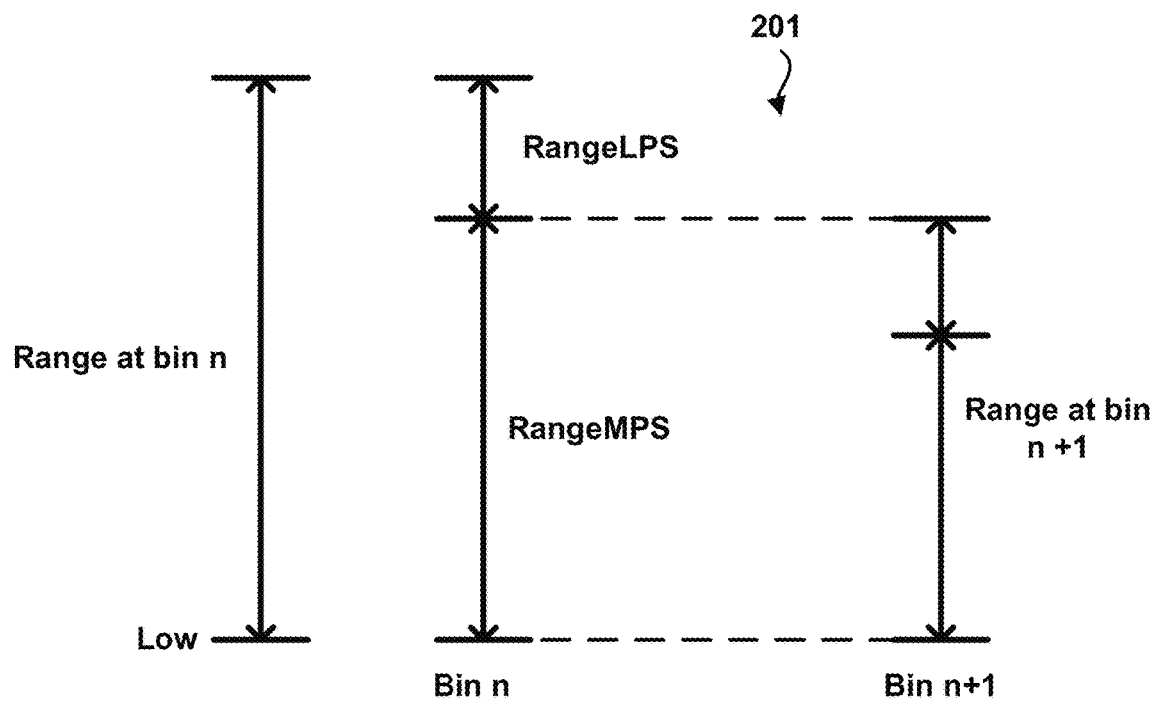
FIGS. 10A and 10B are conceptual diagrams illustrating a range update process in binary arithmetic coding.
Figure 10B:
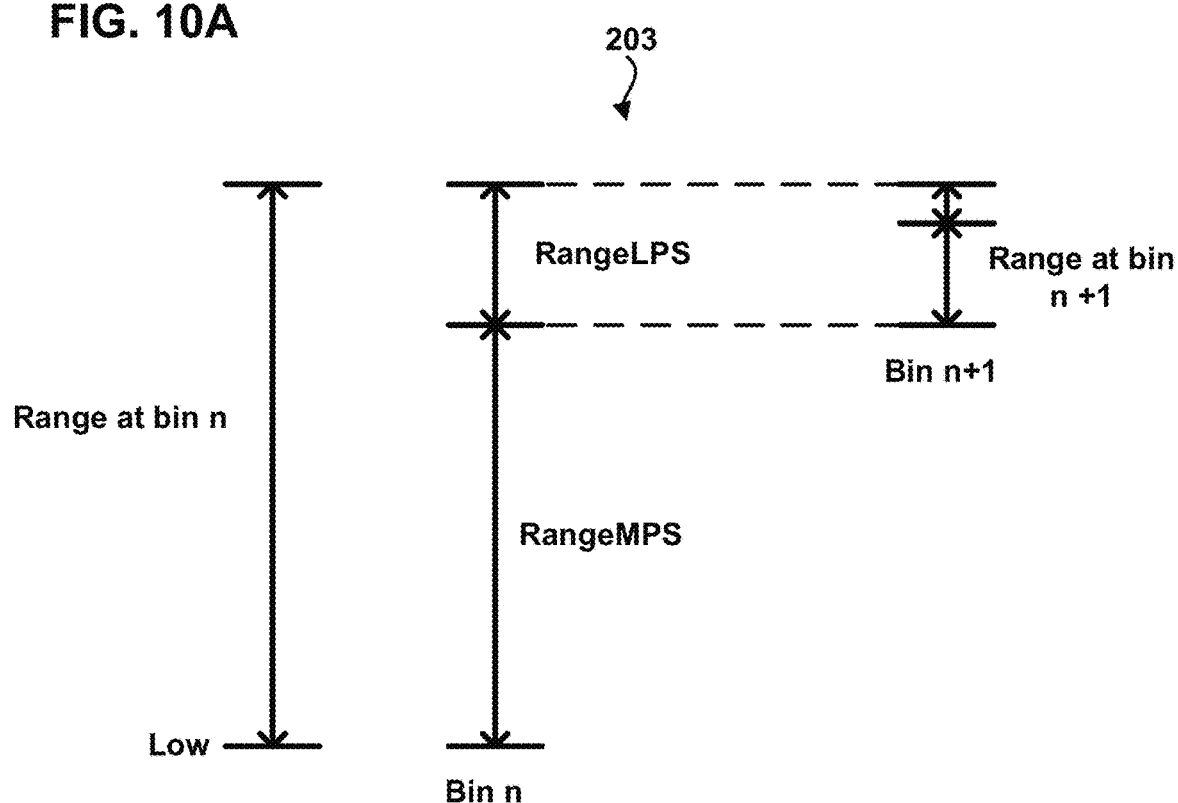

FIGS. 10A and 10B show examples of this process at bin n. In example 201 of FIG. 10A, the range at bin n includes the RangeMPS and RangeLPS given by the probability of the LPS ($p_\sigma$) given a certain context state ($\sigma$). Example 201 shows the update of the range at bin n+1 when the value of bin n is equal to the MPS. In this example, the low stays the same, but the value of the range at bin n+1 is reduced to the value of RangeMPS at bin n. Example 203 of FIG. 10B shows the update of the range at bin n+1 when the value of bin n is not equal to the MPS (i.e., equal to the LPS). In this example, the low is moved to the lower range value of RangeLPS at bin n. In addition, the value of the range at bin n+1 is reduced to the value of RangeLPS at bin n.

Figure 11:
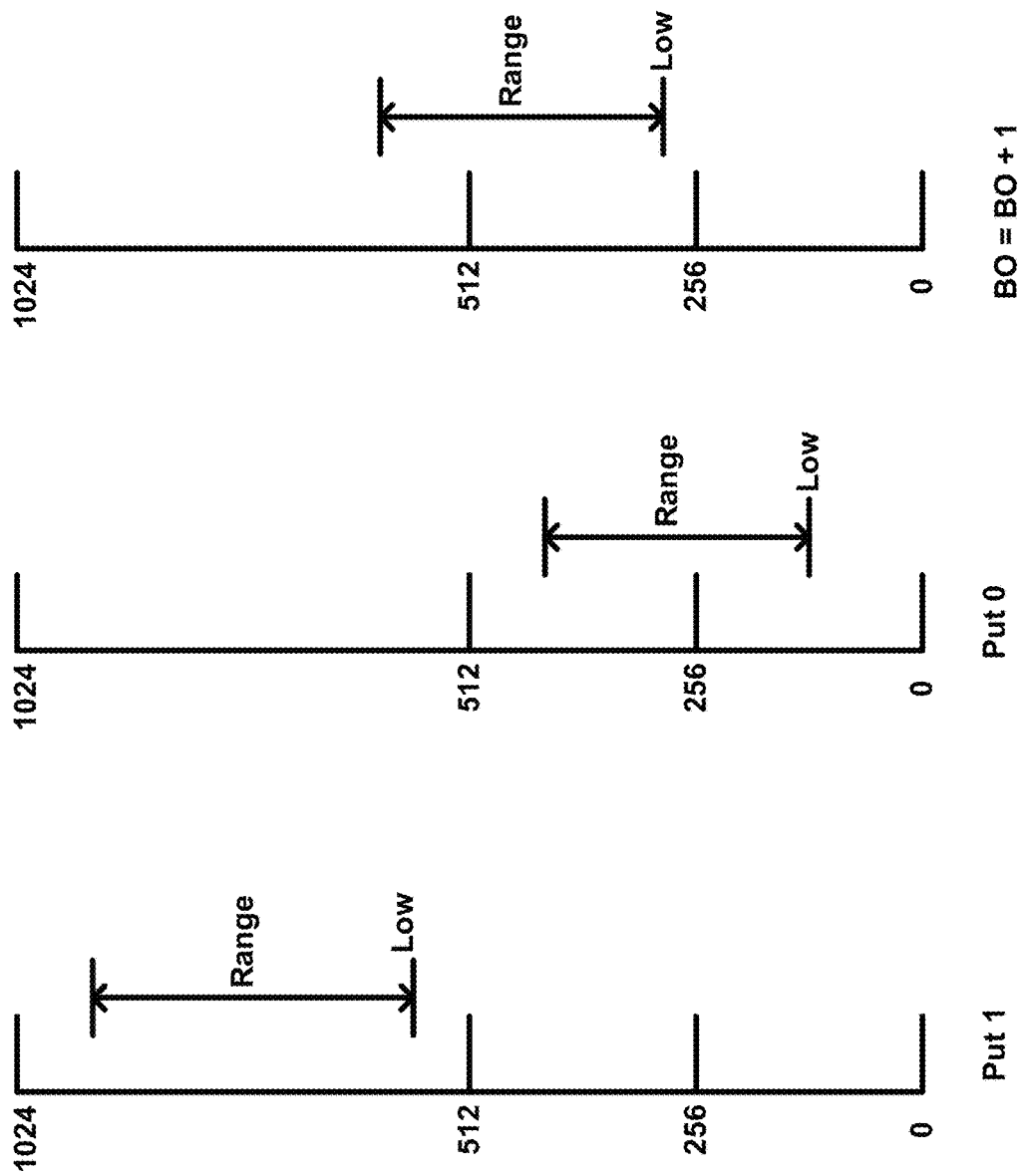
FIG. 11 is a conceptual diagram illustrating an output process in binary arithmetic coding.

In some examples, the range may be expressed with 9 bits and the low with 10 bits. There is a renormalization process to maintain the range and low values at sufficient precision. The renormalization occurs whenever the range is less than 256. Therefore, the range is always equal or larger than 256 after renormalization. Depending on the values of range and low, the BAC outputs to the bitstream, a '0,' or a '1,' or updates an internal variable (called BO: bits-outstanding) to keep for future outputs. FIG. 11 shows examples of BAC output depending on the range. For example, a '1' is output to the bitstream when the range and low are above a certain threshold (e.g., 512). A '0' is output to the bitstream when the range and low are below a certain threshold (e.g., 512). Nothing is output to the bitstream when the range and lower are between certain thresholds. Instead, the BO value is incremented and the next bin is encoded.

As discussed above, arithmetic coding methods may be used to provide high compression efficiency. This is achieved by first transforming the non-binary syntax elements into a binary representation (e.g., 0, 1) using a process called binarization. The resulting transformed entries are called as bins or bin-strings. These bins or bin strings are then fed into the arithmetic coding process. FIG. 11 illustrates an example context adaptive binary arithmetic coding (CABAC) encoding stage. The example CAB AC encoding stage may be implemented in a G-PCC encoder, such as by arithmetic encoding unit 214 and/or arithmetic encoding unit 226 of G-PCC encoder 200 of FIG. 2.

In some examples of G-PCC, context-adaptive binary arithmetic coding (CABAC) may be used for generating the bins through the binarization process. For each coded bin value, an appropriate context model is selected. These context models are used for encoding each bin value into output bits based on the bin probability values. CAB AC engine bypasses context-modeling and bin encoding when the bin is equally probable to be 0 or 1. This is the bypass coding stage discussed below. Otherwise, an appropriate context model is specified as the bin values are encoded and models based on the probability of bin-values. Contexts are adapted as the encoder encodes more bins. Lastly, the context-coded bin values or raw bitstreams are transmitted or otherwise provided to the decoder.

Figure 12:
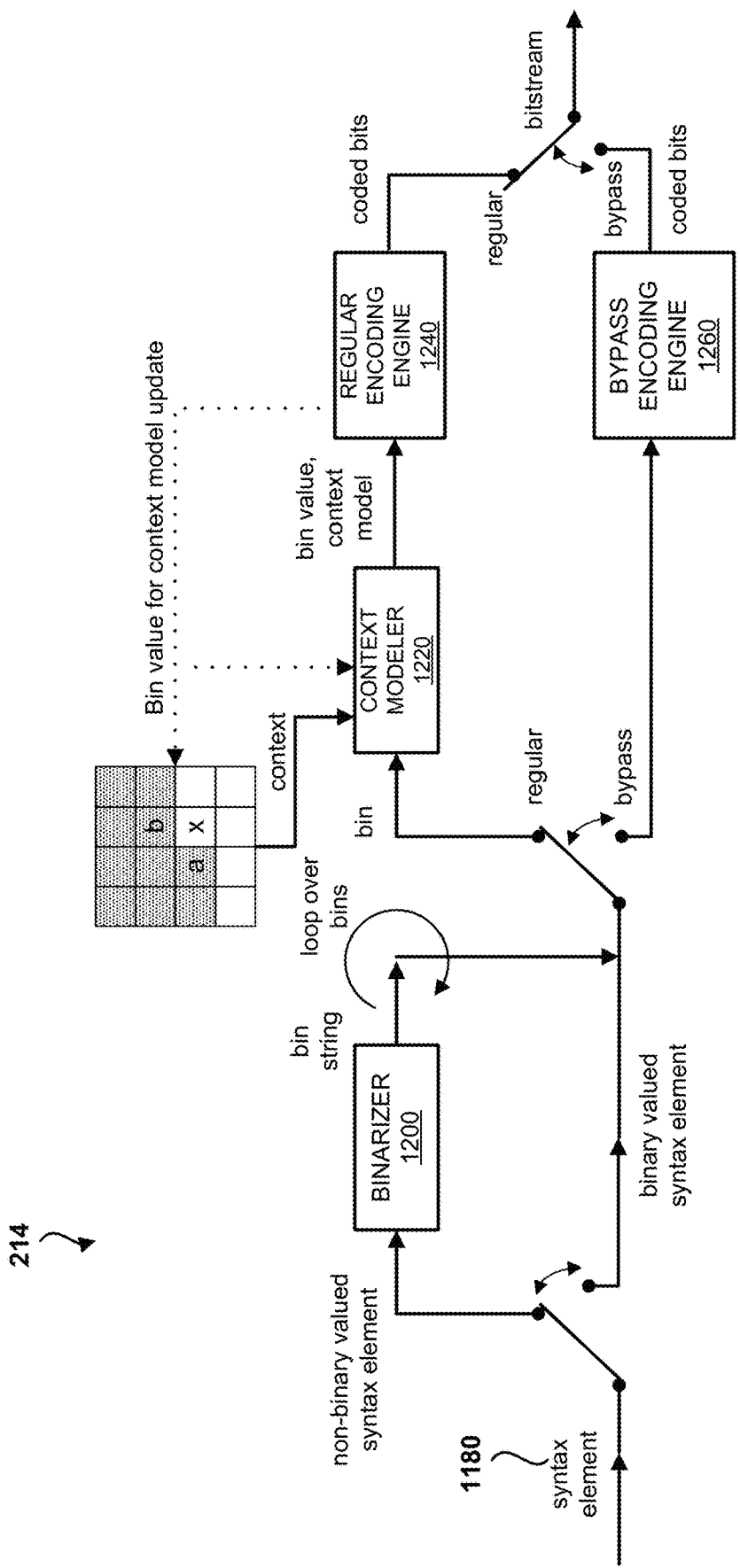
FIG. 12 is a block diagram illustrating a context adaptive binary arithmetic coder in a G-PCC encoder.

FIG. 12 is a block diagram of an example arithmetic encoding unit 214 that may be configured to perform CABAC in accordance with the techniques of this disclosure. A syntax element 1180 is input into the arithmetic encoding unit 214. If the syntax element is already a binary-value syntax element (e.g., a flag or other syntax element that only has a value of 0 and 1), the step of binarization may be skipped. If the syntax element is a non-binary valued syntax element (e.g., a syntax element that may have values other than 1 or 0), the non-binary valued syntax element is binarized by binarizer 1200. Binarizer 1200 performs a mapping of the non-binary valued syntax element into a sequence of binary decisions. These binary decisions are often called "bins." For example, for transform coefficient levels, the value of the level may be broken down into successive bins, each bin indicating whether or not the absolute value of coefficient level is greater than some value. For example, bin 0 (sometimes called a significance flag) indicates if the absolute value of the transform coefficient level is greater than 0 or not. Bin 1 indicates if the absolute value of the transform coefficient level is greater than 1 or not, and so on. A unique mapping may be developed for each non-binary valued syntax element.

Each bin produced by binarizer 1200 is fed to the binary arithmetic coding side of arithmetic encoding unit 214. That is, for a predetermined set of non-binary valued syntax elements, each bin type (e.g., bin 0) is coded before the next bin type (e.g., bin 1). Coding may be performed in either regular mode or bypass mode. In bypass mode, bypass encoding engine 1260 performs arithmetic coding using a fixed probability model, for example, using Golomb-Rice or exponential Golomb coding. Bypass mode is generally used for more predictable syntax elements.

Coding in regular mode involves performing CABAC. Regular mode CABAC is for coding bin values where the probability of a value of a bin is predictable given the values of previously coded bins. The probability of a bin being an LPS is determined by context modeler 1220. Context modeler 1220 outputs the bin value and the probability state for the context (e.g., the probability state σ, including the value of the LPS and the probability of the LPS occurring). The context may be an initial context for a series of bins, or may be determined based on the coded values of previously coded bins. The identify of a context may be expressed and/or be determined based on a value of a variable ctxInc (context increment, such as the value of the ctxInc representing an increment to apply to a previous context). As described above, context modeler 1220 may update the state based on whether or not the received bin was the MPS or the LPS. After the context and probability state σ is determined by context modeler 1220, regular encoding engine 1240 performs BAC on the bin value.

Figure 13:
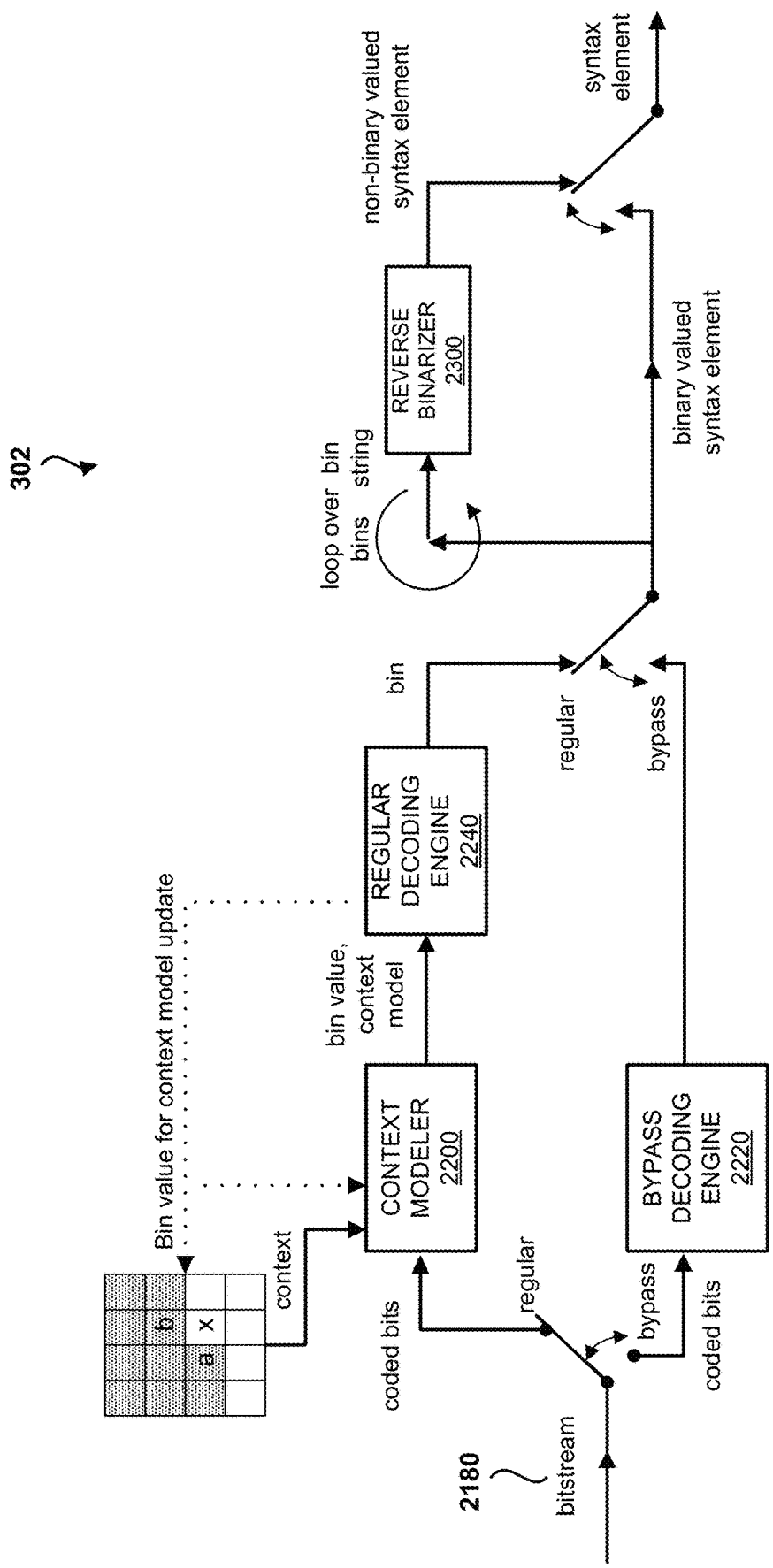
FIG. 13 is a block diagram illustrating a context adaptive binary arithmetic coder in a G-PCC decoder.

FIG. 13 is a block diagram of an example arithmetic decoding unit 302 that may be configured to perform CABAC in accordance with the techniques of this disclosure. The arithmetic decoding unit 302 of FIG. 13 performs CAB AC in an inverse manner as that of arithmetic encoding unit 214 described in FIG. 12. Coded bits from bitstream 2180 are input into arithmetic decoding unit 302. The coded bits are fed to either context modeler 2200 or bypass decoding engine 2220 based on whether they were entropy coded using regular mode or bypass mode. If the coded bits were coded in bypass mode, bypass decoding engine will use Golomb-Rice or exponential Golomb decoding, for example, to retrieve the binary-valued syntax elements or bins of non-binary syntax elements.

If the coded bits were coded in regular mode, context modeler 2200 may determine a probability model for the coded bits and regular decoding engine 2240 may decode the coded bits to produce bins of non-binary valued syntax elements (or the syntax elements themselves if binary-valued). After the context and probability state σ is determined by context modeler 2200, regular decoding engine 2240 performs BAC to decode the bin value. In other words, regular decoding engine 2240 may determine a probability state of a context, and decode a bin value based on previously coded bins and a current range. After decoding the bin, context modeler 2200 may update the probability state of the context based on the window size and the value of the decoded bin.

Figure 14:
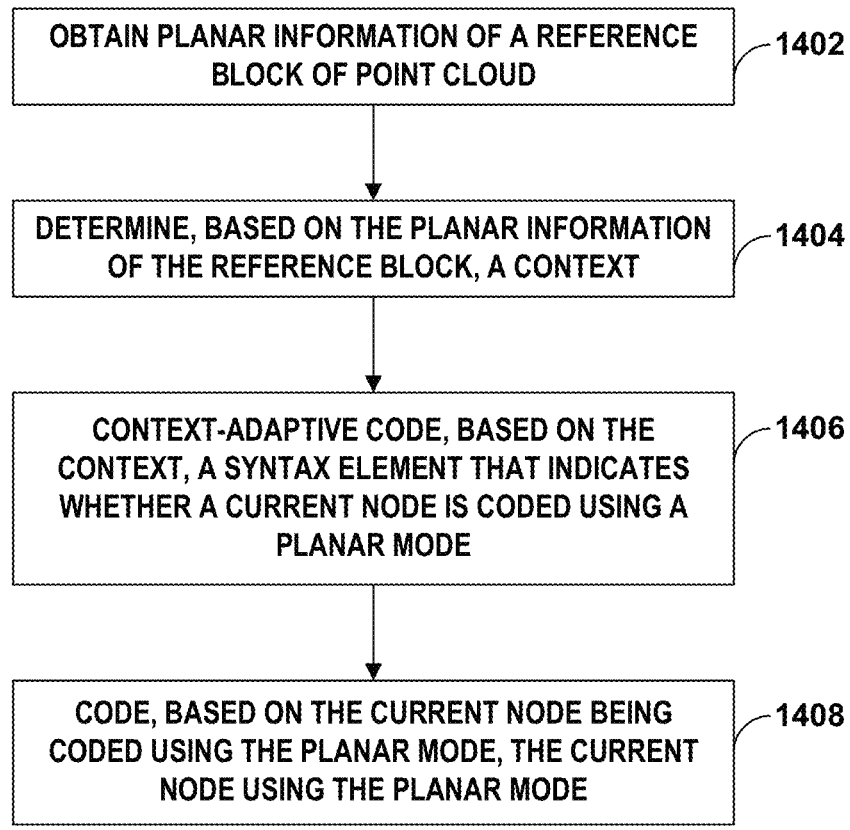
FIG. 14 is a flow diagram illustrating an example technique predicting points of a point cloud, in accordance with one or more aspects of this disclosure.

FIG. 14 is a flow diagram illustrating an example technique predicting points of a point cloud, in accordance with one or more aspects of this disclosure. The technique of FIG. 14 may be performed by a G-PCC coder, such as G-PCC encoder 200 of FIG. 2. However, other devices may perform the technique of FIG. 14, such as G-PCC decoder 300 of FIG. 3.

G-PCC encoder 200 may obtain planar information of a reference block of the point cloud (1402). For instance, arithmetic encoding unit 214 of G-PCC encoder 200 may determine whether the reference block is coded using the planar mode in a particular direction (e.g., PlanarModeRef[axisIdx], which may indicate whether the reference block/node is planar in the axisIdx direction).

G-PCC encoder 200 may determine, based on the planar information of the reference block, a context (1404). For instance, arithmetic coding unit 214 may determine a context index (ctxIdx) based on the planar information of the reference block. As one example, arithmetic coding unit 214 may determine ctxIdx as (2*axisIdx+PlanarModeRef[axisIdx]).

G-PCC encoder 200 may context-adaptive code, based on the context, a syntax element that indicates whether a current node is coded using a planar mode (1406). For instance, arithmetic encoding unit 214 may perform context adaptive binary arithmetic coding (CABAC) of an is_planar_flag syntax element for the current node based on the ctxIdx. As noted above, the is_planar_flag syntax element equal to 1 may indicate that the positions of the current node's children form a single plane perpendicular to the axisIdx-th axis. is_planar_flag[axisIdx] equal to 0, when present, may indicate that the positions of the current node's children occupy both planes perpendicular to the axisIdx-th axis.

G-PCC encoder 200 may code, based on the current node being coded using the planar mode, the current node using the planar mode (1408). For instance, G-PCC encoder 200 may code the current node's children as forming a single plane.

In some examples, where the current node is coded using the planar mode, arithmetic coding unit 214 may determine, based on a reference plane, a second context; and context-adaptive code, based on the second context, a syntax element indicating a plane for the current node. The syntax element indicating the plane for the current node may be a plane_position syntax element. In some examples, to determine the second context based on the reference plane, arithmetic coding unit 214 may determine a context index in accordance with the following equation: ctxIdx=(12×axisIdx+4×adjPlaneCtxInc+2×distCtxInc+prevPlane+3)+(RefPlane[axisIdx]+1)×N, wherein ctxIdx is the context index, axisIdx is an axis index, adjPlaneCtxInc is an adjusted plane context increment, distCtxInc is a distance context increment, prevPlane is a previous plane, and RefPlane[axisIdx] is the reference plane.

In some examples, arithmetic coding unit 214 may determine an angular context for the current node based on a reference plane; and determine, based on the angular context, a plane for the current node. To code the current node using the planar mode, G-PCC encoder 200 may code the current node based on the plane.

In some examples, arithmetic coding unit 214 may determine an azimuthal context for the current node based on a reference plane; and determine, based on the azimuthal context, a plane for the current node. To code the current node using the planar mode, G-PCC encoder 200 may code the current node based on the plane. In some examples, to determine the of azimuthal context, arithmetic coding unit 214 may determine the azimuthal context in accordance with the following equation: contextAzimuthal=contextAnglePhi+8×(RefPlane[axisIdx]+1), wherein contextAzimuthal is the azimuthal context, contextAnglePhi is an intermediate value used to derive azimuthal contexts, and RefPlane[axisIdx] is the reference plane. Multiple azimuthal contexts may be derived based on contextAnglePhi, including contextAzimuthalS and contextAzimuthalT.

In some examples, the current node may be selectively coded using a planar copy mode (PCM). For instance, G-PCC encoder 200 may determine whether to copy planar information for the current node from a reference node. G-PCC encoder 200 may signal whether or not the current node is coded using PCM. For instance, arithmetic coding unit 214 may code a syntax element, such as a binary flag, that indicates whether the current node is coded using a planar copy mode (e.g., PCM_flag). Where the current node is coded using the planar copy mode, G-PCC decoder 300 may copy planar information of the current node from a reference node. For instance, G-PCC decoder 300 may utilize a plane position of the reference node as a plane position of the current node. Similarly, where the current node is not coded using the planar copy mode, G-PCC encoder 200 may encode (and G-PCC decoder 300 may decode), the planar information for the current node from a bitstream. In this way, the PCM may improve coding efficiency.

The following numbered clauses may illustrate one or more aspects of the disclosure:

Clause 1A. A method of coding point cloud data, the method comprising: obtaining planar information of a reference block of the point cloud data; and coding, based on the obtained planar information, a current block of the point cloud data Clause 2A. The method of clause 1A, wherein coding the current block of the point cloud data comprises: determining, for a current direction of the current block, a planar rate based at least in part on whether the reference block is coded using planar mode in the current direction.

Clause 3A. The method of clause 1A, wherein coding the current block of the point cloud data comprises: determining whether the current block is planar eligible based on whether the reference block is planar.

Clause 4A. The method of clause 1A, further comprising: coding, in a coded bitstream, a syntax element having a value that indicates whether the current block and the reference block share a same planar mode in all directions.

Clause 5A. The method of clause 1A, further comprising: coding, in the coded bitstream, a syntax element having a value that indicates whether the current block and the reference block share a same plane position index.

Clause 5A. The method of clause 1A, wherein coding the current block of the point cloud data comprises: determining a context for context-adaptive coding of a planar flag of the current block based on whether the reference block is planar.

Clause 6A. The method of clause 1A, wherein coding the current block of the point cloud data comprises: determining an angular context for the current block based on a planar mode of an planar position of the reference block.

Clause 7A. A device for processing a point cloud, the device comprising one or more means for performing the method of any of clauses 1A-6A.

Clause 8A. The device of clause 7A, wherein the one or more means comprise one or more processors implemented in circuitry.

Clause 9A. The device of any of clauses 7A or 8A, further comprising a memory to store the data representing the point cloud.

Clause 10A. The device of any of clauses 7A-9A, wherein the device comprises a decoder.

Clause 11A. The device of any of clauses 7A-10A, wherein the device comprises an encoder.

Clause 12A. The device of any of clauses 7A-11A, further comprising a device to generate the point cloud.

Clause 13A. The device of any of clauses 7A-12A, further comprising a display to present imagery based on the point cloud.

Clause 14A. A computer-readable storage medium having stored thereon instructions that, when executed, cause one or more processors to perform the method of any of clauses 1A-6A.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device for processing a point cloud, the device comprising:
   a memory configured to store at least a portion of the point cloud; and
   one or more processors implemented in circuitry and configured to:
      obtain planar information of a reference node of the point cloud;
      determine, based on the planar information of the reference node, a context;
      context-adaptive code, based on the context, a syntax element that indicates whether a current node is coded using a planar mode;
      determine an azimuthal context for the current node based on (a) a reference plane, and (b) an intermediate value used to derive azimuthal contexts;
      determine, based on the azimuthal context, a plane for the current node; and
      code, the current node being coded using the planar mode based on the plane.

2. The device of claim 1, wherein the syntax element that indicates whether the current node is coded using the planar mode comprises a is_planar_flag syntax element.

3. The device of claim 1, wherein the context is a first context, and wherein the one or more processors are further configured to:
   responsive determining that the current node is coded using the planar mode:
      determine, based on the reference plane, a second context; and
      context-adaptive code, based on the second context, a syntax element indicating the plane for the current node.

4. The device of claim 3, wherein the syntax element indicating the plane for the current node comprises a plane_position syntax element.

5. The device of claim 3, wherein, to determine the second context based on the reference plane, the one or more processors are configured to determine a context index in accordance with the following equation:

$$ctxIdx=(12\times axisIdx+4\times adjPlaneCtxInc+2\times distCtxInc+prevPlane+3)+(RefPlane[axisIdx]+1)\times N,$$

wherein ctxIdx is the context index, axisIdx is an axis index, adjPlaneCtxInc is an adjusted plane context increment, distCtxInc is a distance context increment, prevPlane is a previous plane, RefPlane[axisIdx] is the reference plane, and N is the number of contexts supported using axisIdx, adjPlaneCtxInc, distCtxInc, and prevPlane.

6. The device of claim 1, wherein the one or more processors are configured to:
- determine an angular context for the current node based on the reference plane; and
- determine, based on the angular context, a plane for the current node.

7. The device of claim 1, wherein, to determine the of azimuthal context, the one or more processors are configured to determine the azimuthal context in accordance with the following equation:

$$contextAzimuthal=contextAnglePhi+8\times(RefPlane[axisIdx]+1),$$

wherein contextAzimuthal is the azimuthal context, contextAnglePhi is the intermediate value used to derive azimuthal contexts, and RefPlane[axisIdx] is the reference plane.

8. The device of claim 1, wherein the one or more processors are further configured to:
- code a syntax element that indicates whether the current node is coded using a planar copy mode; and
- copy, where the current node is coded using the planar copy mode, planar information of the current node from a reference node.

9. The device of claim 8, wherein, to copy the planar information, the one or more processors are configured to:
- utilize a plane position of the reference node as a plane position of the current node.

10. The device of claim 8, wherein the syntax element that indicates whether the current node is coded using the planar copy mode comprises a binary flag.

11. The device of claim 1, further comprising:
- a spinning LIDAR sensor, wherein the one or more processors are configured to generate the point cloud based on data generated by the spinning LIDAR sensor.

12. The device of claim 11, wherein the device is a vehicle that includes the spinning LIDAR sensor.

13. The device of claim 1, wherein the device is a wireless communication device.

14. A method of coding point cloud data, the method comprising:
- obtaining planar information of a reference node of the point cloud;
- determining, based on the planar information of the reference node, a context;
- context-adaptive coding, based on the context, a syntax element that indicates whether a current node is coded using a planar mode; and
- determining an azimuthal context for the current node based on (a) a reference plane, and (b) an intermediate value used to derive azimuthal contexts;
- determining, based on the azimuthal context, a plane for the current node; and
- coding, the current node being coded using the planar mode based on the plane.

15. The method of claim 14, wherein the syntax element that indicates whether the current node is coded using the planar mode comprises a is_planar_flag syntax element.

16. The method of claim 14, wherein the context is a first context, the method further comprising: responsive determining that the current node is coded using the planar mode:
- determining, based on the reference plane, a second context; and
- context-adaptive coding, based on the second context, a syntax element indicating the plane for the current node.

17. The method of claim 16, wherein the syntax element indicating the plane for the current node comprises a plane_position syntax element.

18. The method of claim 16, wherein determining the second context based on the reference plane comprises determining a context index in accordance with the following equation:

$$ctxIdx=(12\times axisIdx+4\times adjPlaneCtxInc+2\times distCtxInc+prevPlane+3)+(RefPlane[axisIdx]+1)\times N,$$

wherein ctxIdx is the context index, axisIdx is an axis index, adjPlaneCtxInc is an adjusted plane context increment, distCtxInc is a distance context increment, prevPlane is a previous plane, RefPlane[axisIdx] is the reference plane, and N is the number of contexts supported using axisIdx, adjPlaneCtxInc, distCtxInc, and prevPlane.

19. The method of claim 14, further comprising
- determining an angular context for the current node based on the reference plane; and
- determining, based on the angular context, the plane for the current node.

20. The method of claim 14, wherein determining the of azimuthal context comprises determining the azimuthal context in accordance with the following equation:

$$contextAzimuthal=contextAnglePhi+8\times(RefPlane[axisIdx]+1),$$

wherein contextAzimuthal is the azimuthal context, contextAnglePhi is the intermediate value used to derive azimuthal contexts, and RefPlane[axisIdx] is the reference plane.

21. A non-transitory computer-readable storage medium storing instructions that, when executed, cause one or more processors to:
- obtain planar information of a reference node of a point cloud;
- determine, based on the planar information of the reference node, a context;
- context-adaptive code, based on the context, a syntax element that indicates whether a current node is coded using a planar mode; and
- determine an azimuthal context for the current node based on (a) a reference plane, and (b) an intermediate value used to derive azimuthal contexts;
- determine, based on the azimuthal context, a plane for the current node; and
- code, the current node being coded using the planar mode based on the plane.

* * * * *